(12) United States Patent  (10) Patent No.: US 12,496,672 B2
Coakley  (45) Date of Patent: Dec. 16, 2025

(54) PIPE MACHINING SYSTEM FOR POSITIONING PIPE MACHINING APPARATUS IN THREE-DIMENSIONAL COORDINATE SYSTEM

(71) Applicant: Illinois Tool Works Inc., Glenview, IL (US)

(72) Inventor: Roy C. Coakley, Northlake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 729 days.

(21) Appl. No.: 17/389,559

(22) Filed: Jul. 30, 2021

(65) Prior Publication Data

US 2021/0354259 A1 Nov. 18, 2021

Related U.S. Application Data

(62) Division of application No. 16/442,786, filed on Jun. 17, 2019, now Pat. No. 11,097,394.

(60) Provisional application No. 62/686,195, filed on Jun. 18, 2018.

(51) Int. Cl.
*B23Q 15/12* (2006.01)
*B23B 5/08* (2006.01)
*B23B 25/06* (2006.01)
*B23Q 15/013* (2006.01)
*B23Q 17/20* (2006.01)

(52) U.S. Cl.
CPC .............. *B23Q 15/12* (2013.01); *B23B 5/08* (2013.01); *B23B 25/06* (2013.01); *B23Q 15/013* (2013.01); *B23Q 17/20* (2013.01)

(58) Field of Classification Search
CPC ...... B23Q 15/12; B23Q 15/013; B23Q 17/20; B23Q 2240/007; B23Q 9/0021; B23Q 9/0057; B23B 5/08; B23B 25/06; B23B 3/26; B23B 5/163; B23K 37/0533; B23K 37/027; B23D 21/04; B23D 35/005
See application file for complete search history.

(56) References Cited

U.S. PATENT DOCUMENTS

| 1,140,208 A | 5/1915 | Taylor |
| 1,301,759 A | 4/1919 | Stewart |
| 1,698,154 A | 1/1929 | Day |

(Continued)

FOREIGN PATENT DOCUMENTS

| CN | 85102879 A | 1/1986 |
| CN | 87101953 A | 9/1988 |

(Continued)

OTHER PUBLICATIONS

International Search Report for corresponding International patent application No. PCT/US2019/037445 mailed Sep. 24, 2019, 5 pages.

(Continued)

*Primary Examiner* — Sara Addisu
(74) *Attorney, Agent, or Firm* — Klintworth & Rozenblat LLP

(57) ABSTRACT

A method of cutting a pipe includes positioning a positioning apparatus on the pipe, moving the positioning apparatus relative to the pipe to center the positioning apparatus on the pipe, attaching a pipe machining apparatus to the positioning apparatus, and moving the pipe machining apparatus relative to the positioning apparatus and relative to the pipe.

18 Claims, 18 Drawing Sheets

(56) References Cited

U.S. PATENT DOCUMENTS

| | | | |
|---|---|---|---|
| 1,852,412 A | 4/1932 | Hickey | |
| 1,886,082 A | 11/1932 | Chapman | |
| 2,358,741 A | 9/1944 | Shelby | |
| 2,364,963 A | 12/1944 | Elliott | |
| 2,408,517 A | 10/1946 | Howard | |
| 2,635,270 A | 4/1953 | Dawson | |
| 2,798,390 A | 7/1957 | Bennett | |
| 2,911,239 A | 11/1959 | Marzolf, Sr. | |
| 2,931,659 A | 4/1960 | Novkov | |
| 2,968,375 A | 1/1961 | Avery, Sr. | |
| 3,253,336 A | 5/1966 | Brown | |
| 3,431,646 A | 3/1969 | Young | |
| 3,651,569 A | 3/1972 | Arnot | |
| 3,732,758 A | 5/1973 | Rinaldo | |
| 3,942,248 A | 3/1976 | Sherer et al. | |
| 4,007,705 A | 2/1977 | Sherer et al. | |
| 4,051,342 A | 9/1977 | Stubbings | |
| 4,112,794 A | 9/1978 | Franks et al. | |
| 4,289,430 A | 9/1981 | Shashaty | |
| 4,318,391 A | 3/1982 | Wachs et al. | |
| 4,366,994 A | 1/1983 | Yoshioka | |
| 4,397,487 A | 8/1983 | Guttman | |
| 4,411,178 A | 10/1983 | Wachs et al. | |
| 4,421,441 A | 12/1983 | Hirose | |
| 4,483,223 A | 11/1984 | Nall et al. | |
| 4,490,909 A | 1/1985 | Wachs et al. | |
| 4,493,150 A | 1/1985 | Garcia et al. | |
| 4,543,861 A | 10/1985 | Kwech et al. | |
| 4,608,755 A | 9/1986 | Braasch | |
| 4,637,285 A | 1/1987 | Mizoguchi | |
| 4,655,108 A | 4/1987 | Galos | |
| 4,677,884 A | 7/1987 | Kwech et al. | |
| 4,716,271 A | 12/1987 | Hulsizer et al. | |
| 4,739,685 A | 4/1988 | Ricci | |
| 4,754,672 A | 7/1988 | VanderPol | |
| 4,762,038 A | 8/1988 | Olson | |
| 4,770,074 A | 9/1988 | Kwech | |
| 4,791,842 A | 12/1988 | Olson | |
| 4,813,314 A | 3/1989 | Kwech | |
| 4,829,860 A | 5/1989 | VanderPol | |
| 4,880,340 A | 11/1989 | Taki et al. | |
| 4,939,964 A | 7/1990 | Ricci | |
| 5,002,440 A | 3/1991 | Tamaoki et al. | |
| 5,013,015 A | 5/1991 | Fatheree | |
| 5,050,291 A | 9/1991 | Gilmore | |
| 5,054,342 A | 10/1991 | Swiatowy et al. | |
| 5,070,600 A | 12/1991 | Brew et al. | |
| 5,117,551 A | 6/1992 | Roman et al. | |
| 5,199,928 A | 4/1993 | Gress et al. | |
| 5,361,659 A | 11/1994 | Hanson | |
| 5,368,399 A | 11/1994 | Tremblay | |
| 5,549,024 A | 8/1996 | Ricci | |
| 5,603,250 A | 2/1997 | Robinson | |
| 5,609,081 A | 3/1997 | Lin | |
| 5,775,188 A | 7/1998 | Strait | |
| 5,875,699 A | 3/1999 | Koelsch | |
| 5,894,772 A | 4/1999 | Nodar | |
| 5,941,145 A | 8/1999 | Marshall et al. | |
| 5,943,927 A | 8/1999 | Hanson et al. | |
| 5,954,462 A | 9/1999 | Way et al. | |
| 6,065,378 A * | 5/2000 | Ricci | B23B 5/08 82/113 |
| 6,227,577 B1 | 5/2001 | Ikeda et al. | |
| 6,257,110 B1 | 7/2001 | Ricci et al. | |
| 6,615,696 B2 | 9/2003 | Ricci et al. | |
| 6,996,914 B1 | 2/2006 | Istre et al. | |
| 7,000,510 B1 | 2/2006 | Place et al. | |
| 7,383,758 B2 | 6/2008 | Place et al. | |
| 7,793,574 B2 | 9/2010 | Sorensen et al. | |
| 8,434,392 B1 | 5/2013 | Lerner et al. | |
| 8,534,170 B2 | 9/2013 | Arnemann | |
| 9,050,669 B2 | 6/2015 | Coakley | |
| 10,208,876 B2 | 2/2019 | Dehais et al. | |
| 10,434,584 B2 | 10/2019 | Coakley | |
| 10,710,177 B2 | 7/2020 | Coakley | |
| 2004/0035171 A1 | 2/2004 | Gormany | |
| 2004/0234352 A1 | 11/2004 | Vanderpol et al. | |
| 2005/0132851 A1 | 6/2005 | Place | |
| 2006/0207395 A1 | 9/2006 | Place et al. | |
| 2009/0191040 A1 | 7/2009 | Liu et al. | |
| 2010/0062887 A1 | 3/2010 | Bodensteiner et al. | |
| 2010/0162860 A1 | 7/2010 | Hall et al. | |
| 2011/0219920 A1 | 9/2011 | Arnemann | |
| 2011/0290091 A1 | 12/2011 | Clark et al. | |
| 2014/0096398 A1 | 4/2014 | Coakley | |
| 2014/0190327 A1 | 7/2014 | Pierce et al. | |
| 2014/0191460 A1 * | 7/2014 | Pierce | B23B 5/161 269/287 |
| 2017/0043417 A1 | 2/2017 | Coakley | |
| 2018/0056408 A1 | 3/2018 | Coakley | |
| 2019/0160604 A1 | 5/2019 | Weinberg | |
| 2019/0381621 A1 | 12/2019 | Coakley | |
| 2023/0009767 A1 * | 1/2023 | Coakley | B23D 21/04 |

FOREIGN PATENT DOCUMENTS

| | | |
|---|---|---|
| CN | 2109276 U | 7/1992 |
| CN | 2254385 Y | 5/1997 |
| CN | 2274107 Y | 2/1998 |
| CN | 1424155 A | 6/2003 |
| CN | 2761329 Y | 3/2006 |
| CN | 101132890 A | 2/2008 |
| CN | 201482987 U | 5/2010 |
| CN | 103100749 A | 5/2013 |
| CN | 103846326 A | 6/2014 |
| CN | 104858681 A | 8/2015 |
| DE | 900042 C | 12/1953 |
| DE | 2439852 A1 | 3/1976 |
| DE | 3603618 C1 | 10/1987 |
| DE | 4240637 C1 | 6/1994 |
| DE | 10020393 A1 | 2/2001 |
| DE | 102009005983 A1 | 7/2010 |
| EP | 0491724 B1 | 1/1994 |
| EP | 0733425 A2 | 9/1996 |
| EP | 0819501 A1 | 1/1998 |
| FR | 2641487 A1 | 7/1990 |
| FR | 3016020 A1 | 7/2015 |
| GB | 2242850 A | 10/1991 |
| WO | WO9103345 A1 | 3/1991 |
| WO | 2010/077349 A1 | 7/2010 |
| WO | 2010/085621 A1 | 7/2010 |
| WO | 2012/071419 A1 | 5/2012 |
| WO | 2014/055610 A1 | 4/2014 |
| WO | 2014/109910 A1 | 7/2014 |

OTHER PUBLICATIONS

Written Opinion for corresponding International patent application No. PCT/US2019/037445 mailed Sep. 24, 2019, 5 pages.
English Machine Translation of FR3016020.
English Machine Translation of DE900042.
HST2121, "H&S Tool Clamshell.mpg," Dec. 22, 2009, Published on YouTube, https://www.youtube.com/watch?v=Okfh-ODTj-8.
https://www.amazon.com/dp/B018FWF7X4?tag=architecture_lab-20&linkCode=ogi&th=1&psc=1.
https://us.misumi-ec.com/vona2/detail/223006661826/.
English Machine Translation of CN1424155.
English Machine Translation of CN2109276.
English Machine Translation of CN201482987.
English Machine Translation of CN2254385.
English Machine Translation of CN2274107.
English Machine Translation of DE2439852.
English Machine Translation of CN87101953.
English Machine Translation of CN2761329.
English Machine Translation of CN85102879.
English Machine Translation of DE3603618.
English Machine Translation of DE4240637.
English Machine Translation of DE10020393.
Chinese Office Action issued in connection with CN application No. 20198037238.2 dated Feb. 13, 2023, 7 pages.

(56) References Cited

OTHER PUBLICATIONS

Chinese search report issued in connection with CN application No. 20198037238.2 dated Feb. 13, 2023, 1 page.
International Preliminary Report on Patentatbility issued for corresponding International patent application No. PCT/US2019/037445 mailed Dec. 30, 2020, 6 pages.

* cited by examiner

PIPE MACHINING SYSTEM FOR POSITIONING PIPE MACHINING APPARATUS IN THREE-DIMENSIONAL COORDINATE SYSTEM

This application is a divisional application of U.S. Provisional application Ser. No. 16/442,786, filed on Jun. 17, 2019, and claims the benefit of U.S. Provisional Application Ser. No. 62/686,195, filed on Jun. 18, 2018, the contents of which are incorporated herein in its entirety.

FIELD OF THE INVENTION

The present disclosure generally relates to a pipe machining system and, more particularly, to positioning a pipe machining apparatus in a three-dimensional coordinate system.

BACKGROUND

A variety of different types of pipe machining apparatuses exist to perform various machining processes on pipes. One such process includes cutting pipes. Such pipes may be cut to remove a damaged or worn pipe portion and to facilitate a replacement pipe portion to be coupled in place of the removed pipe portion. Pipe machining apparatuses are typically coupled to a pipe manually by manually tightening and loosening clamping mechanisms against an interior or exterior of the pipe. Such a manual process may lack accuracy required in certain environments. Some environments include a large quantity of piping and such environments require extremely accurate and tightly tolerance pipe cuts that cannot be achieved manually. Furthermore, in such environments, the sheer number of pipes may create confusion for the operator as to where to make cuts, to which pipe to couple the pipe machining apparatus, and where to bring the new pipe portion after a portion of a pipe has been removed.

SUMMARY

The present disclosure is defined by the following claims, and nothing in this section should be taken as a limitation on those claims.

A method of cutting a pipe includes positioning a positioning apparatus on the pipe, moving the positioning apparatus relative to the pipe to center the positioning apparatus on the pipe, attaching a pipe machining apparatus to the positioning apparatus, and moving the pipe machining apparatus relative to the positioning apparatus and relative to the pipe.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
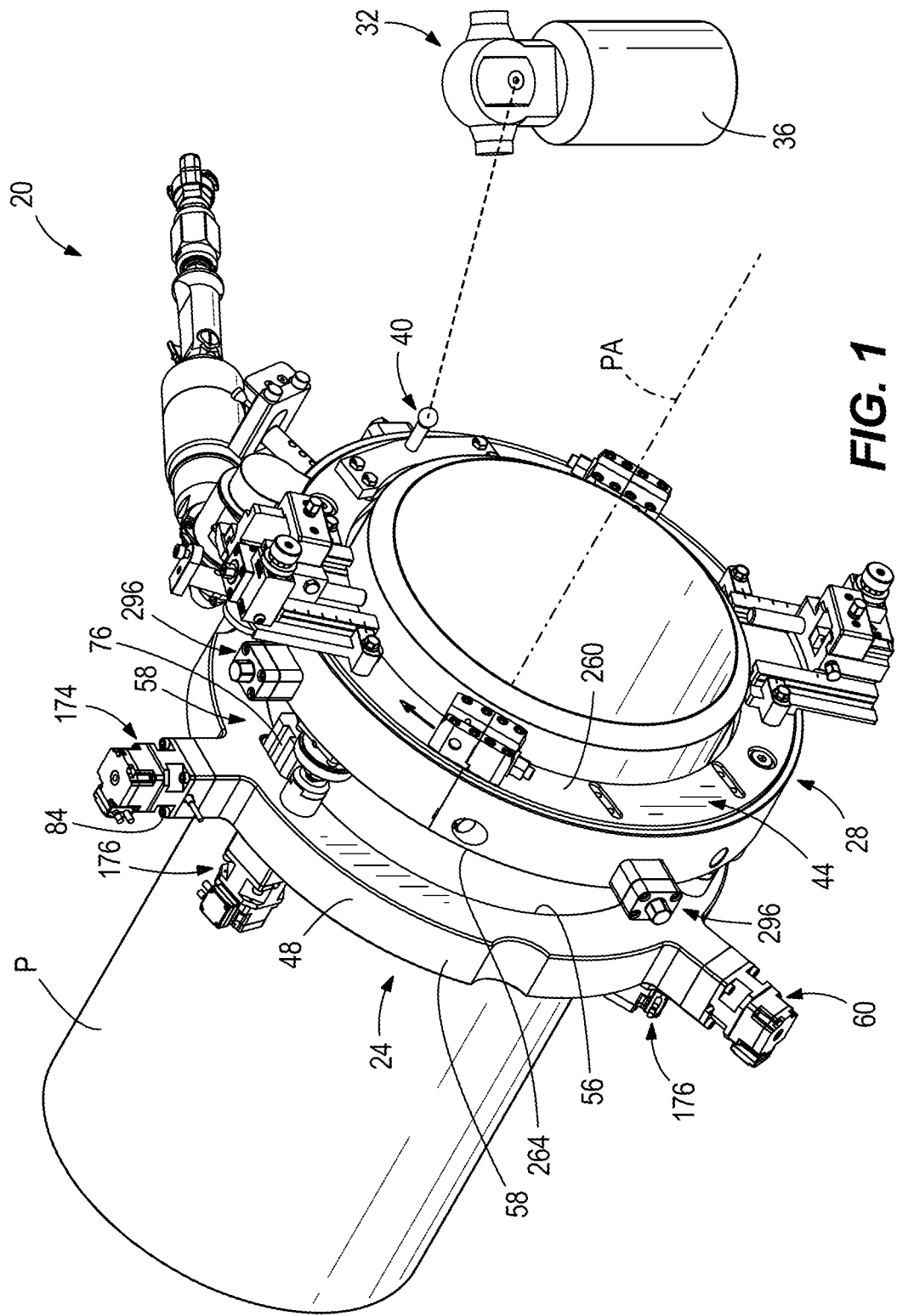
FIG. 1 is a top, front perspective view of one example of a pipe machining system coupled to one example of a pipe, with the pipe machining system including one example of a positioning apparatus, one example of a pipe machining apparatus, and one example of a position tracking apparatus.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

With reference to FIG. 1, one example of a pipe machining system 20 is illustrated. In this example, the pipe machining system 20 includes one example of a positioning apparatus 24, one example of a pipe machining apparatus 28, and one example of a position tracking apparatus 32. The pipe machining system 20 is capable of positioning the pipe machining apparatus 28 in a desired position relative to a pipe P to enable the pipe machining apparatus 28 to perform a cutting operation on the pipe P. The positioning apparatus 24 positions the pipe machining apparatus 28 relative to the pipe P and the position tracking apparatus 32 tracks a position of the pipe machining apparatus 28. The position of the pipe machining apparatus 28 may be tracked in a variety of manners. In one example, the position tracking apparatus 32 tracks a position of the pipe machining apparatus 28 relative to the pipe P. In one example, the position tracking apparatus 32 tracks a position of the pipe machining apparatus 28 within a larger three-dimensional coordinate system or environment. Such a three-dimensional coordinate system or environment may be any environment. Examples of such environments may include, but are not limited to, a manufacturing facility, a gas or oil facility, a refinery, a chemical facility, a nuclear facility, a pipeline facility or other pipeline environment, a vessel such as a ship, among others. In one example, the position tracking apparatus 32 may track the position of the pipe machining apparatus 28 relative to multiple things and/or environments (e.g., both the pipe and within a three-dimensional environment).

With continued reference to FIG. 1, the position tracking apparatus 32 is capable of being a wide variety of types of position tracking apparatuses. For example, the position tracking apparatus 32 may be a laser-based position tracking apparatus 32 including a laser emitter/receiver 36 and a reflective member 40 capable of being engaged by the emitted laser and reflecting the laser back to the laser emitter/receiver 36. In one example, the laser emitter and receiver 36 may be within a single housing and considered a single apparatus. In another example, the laser emitter and the laser receiver may each have their own housing and be considered separate apparatuses. The reflective member 40 is coupled to an apparatus for which its position is desired to be tracked. In the illustrated example, the reflective member 40 is coupled to the pipe machining apparatus 28 and, more particularly, to a tool carrier 44 of the pipe machining apparatus 28. The tool carrier 44 is rotatably mounted in a frame 46 as is known in the art and a longitudinal central axis B of the pipe machining apparatus 28 is defined. In some instances, it is desirable to couple the reflective member 40 to the pipe machining apparatus 28 in order to track a position of a cutting plane CP of the pipe machining apparatus 28. In other examples, the position tracking apparatus 32 may be other types of position tracking apparatuses and all of such possibilities are intended to be within the spirit and scope of the present disclosure.

Figure 2:
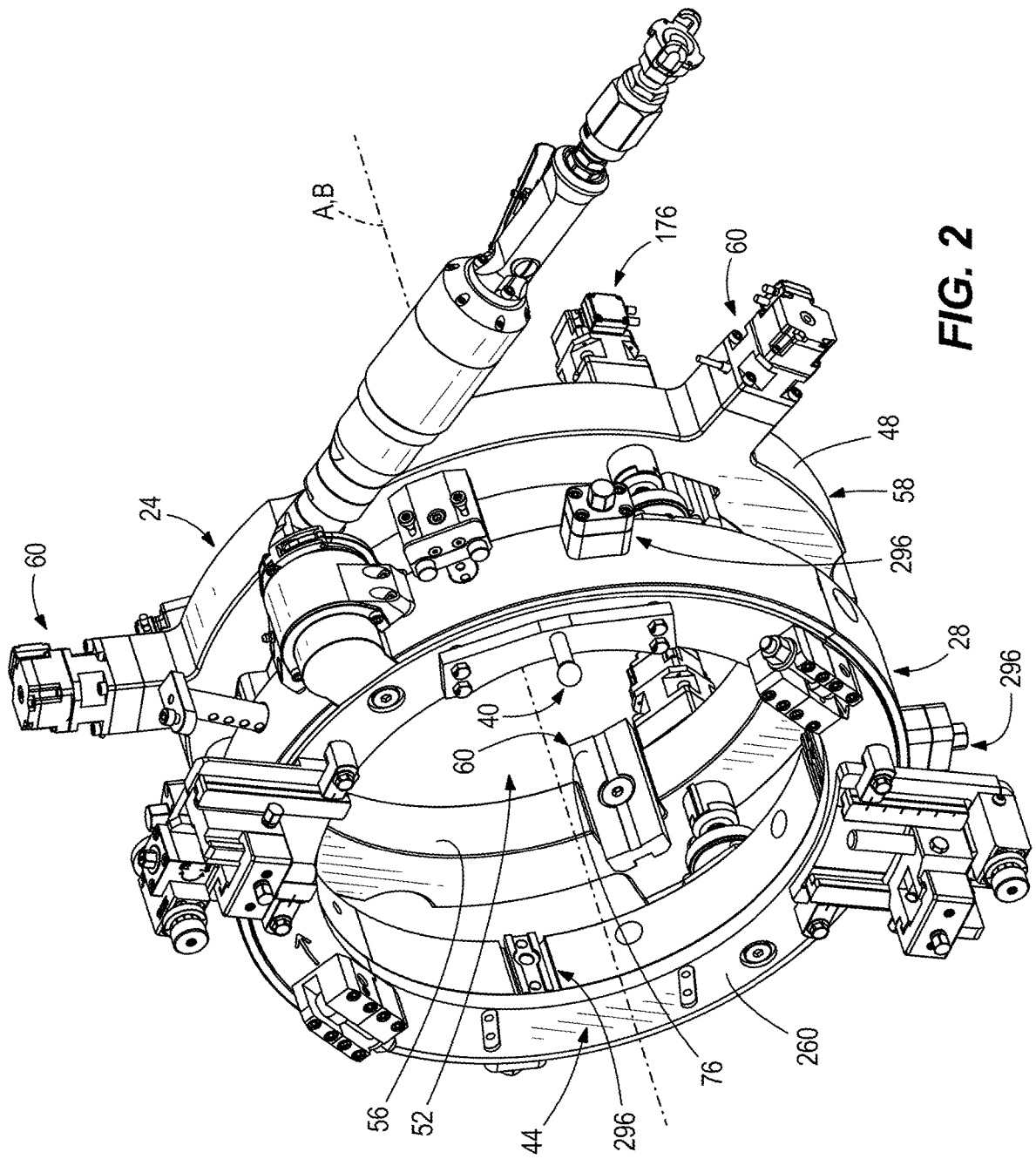
FIG. 2 is another top, front perspective view of a portion of the pipe machining system without the position tracking apparatus.
Figure 3:
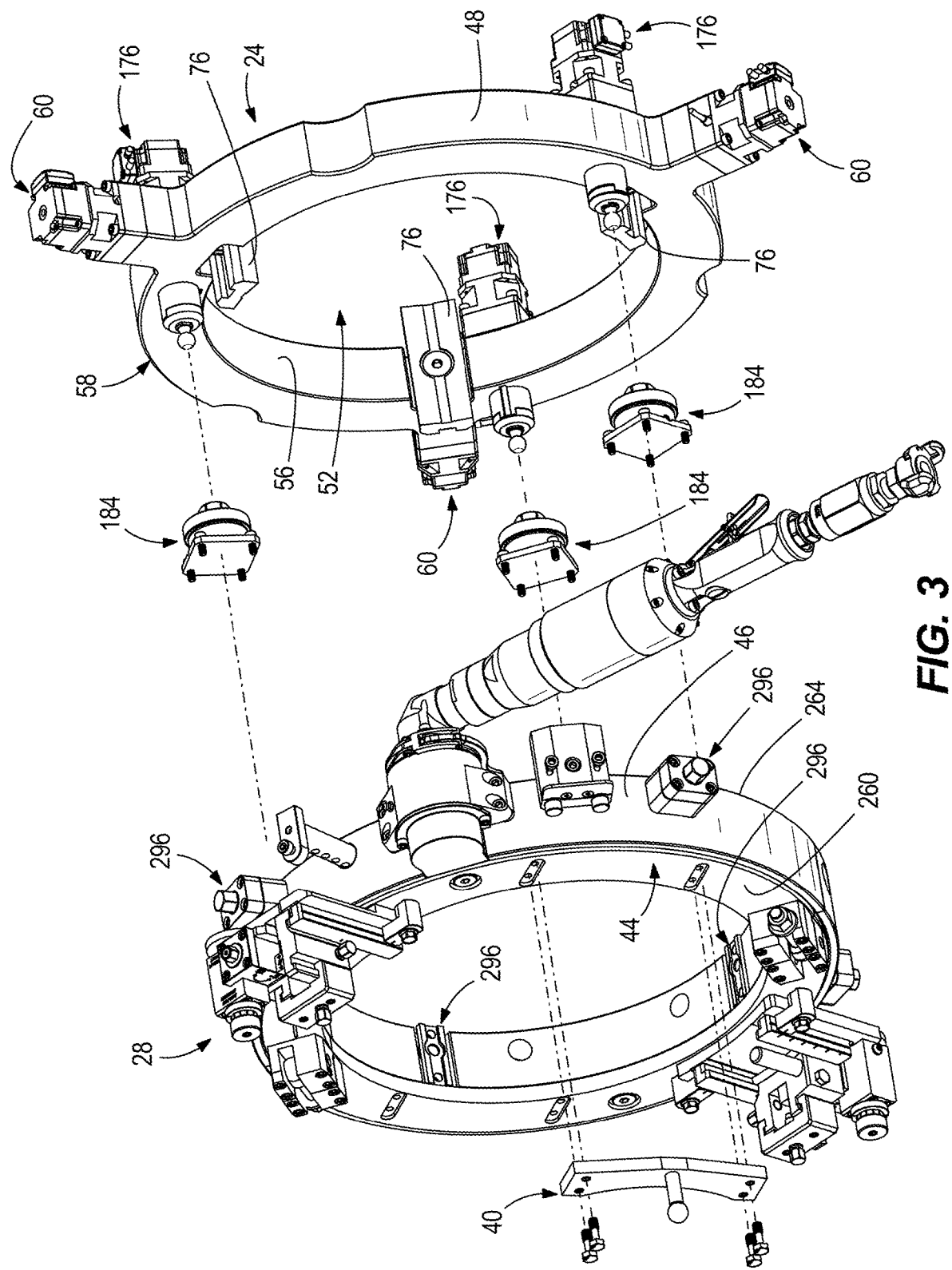
FIG. 3 is a partial exploded view of the pipe machining system showing the positioning apparatus and the pipe machining apparatus.

With reference to FIGS. 1-3, one example of the pipe machining apparatus 28 is illustrated. The illustrated exemplary pipe machining apparatus 28 may be similar to the pipe machining apparatus 28 disclosed in U.S. patent application Ser. No. 13/796,121, filed Mar. 12, 2013, now U.S. Pat. No. 10,710,177, which is incorporated by reference. The present pipe machining apparatus 28 is provided to demonstrate principles of the present disclosure and is not intended to be limiting. The pipe machining system 20 is capable of having a wide variety of types of pipe machining apparatuses and all of such possibilities are intended to be within the spirit and scope of the present disclosure.

Figure 4:
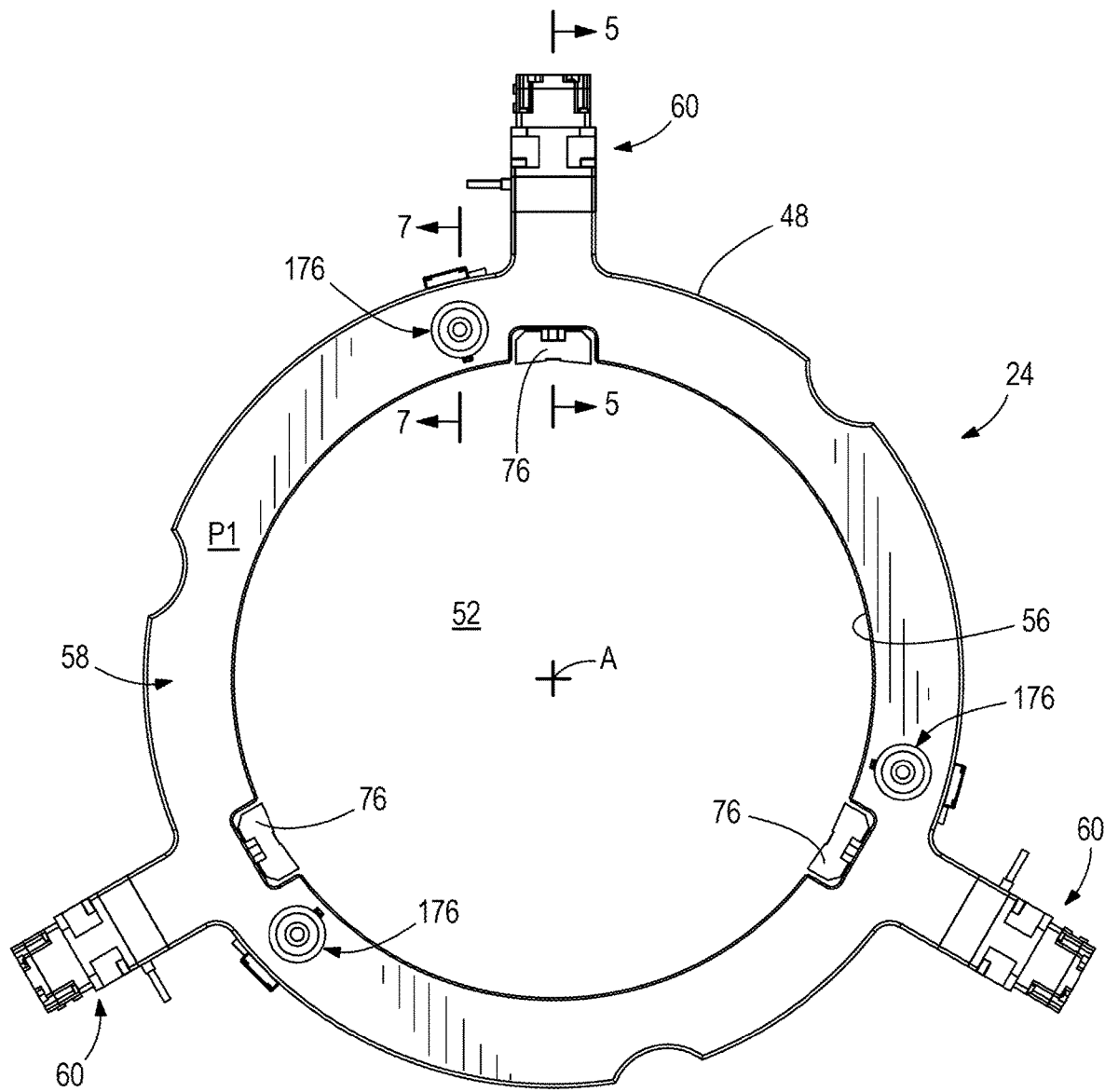
FIG. 4 is a front elevation view of the positioning apparatus.
Figure 4A:
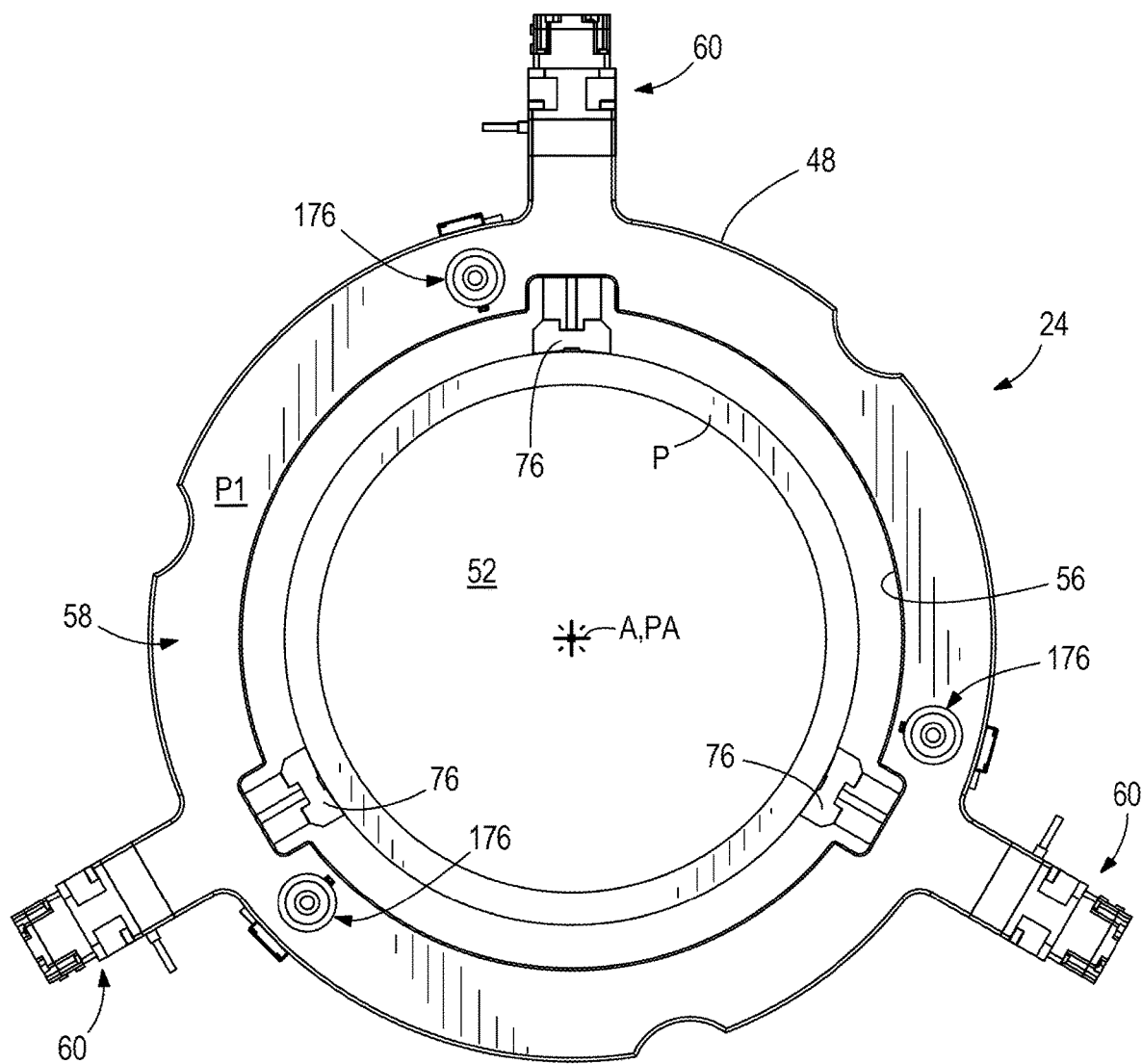
FIG. 4A is a front elevation view of the positioning apparatus with the pipe inserted therein and in a first position.
Figure 4B:
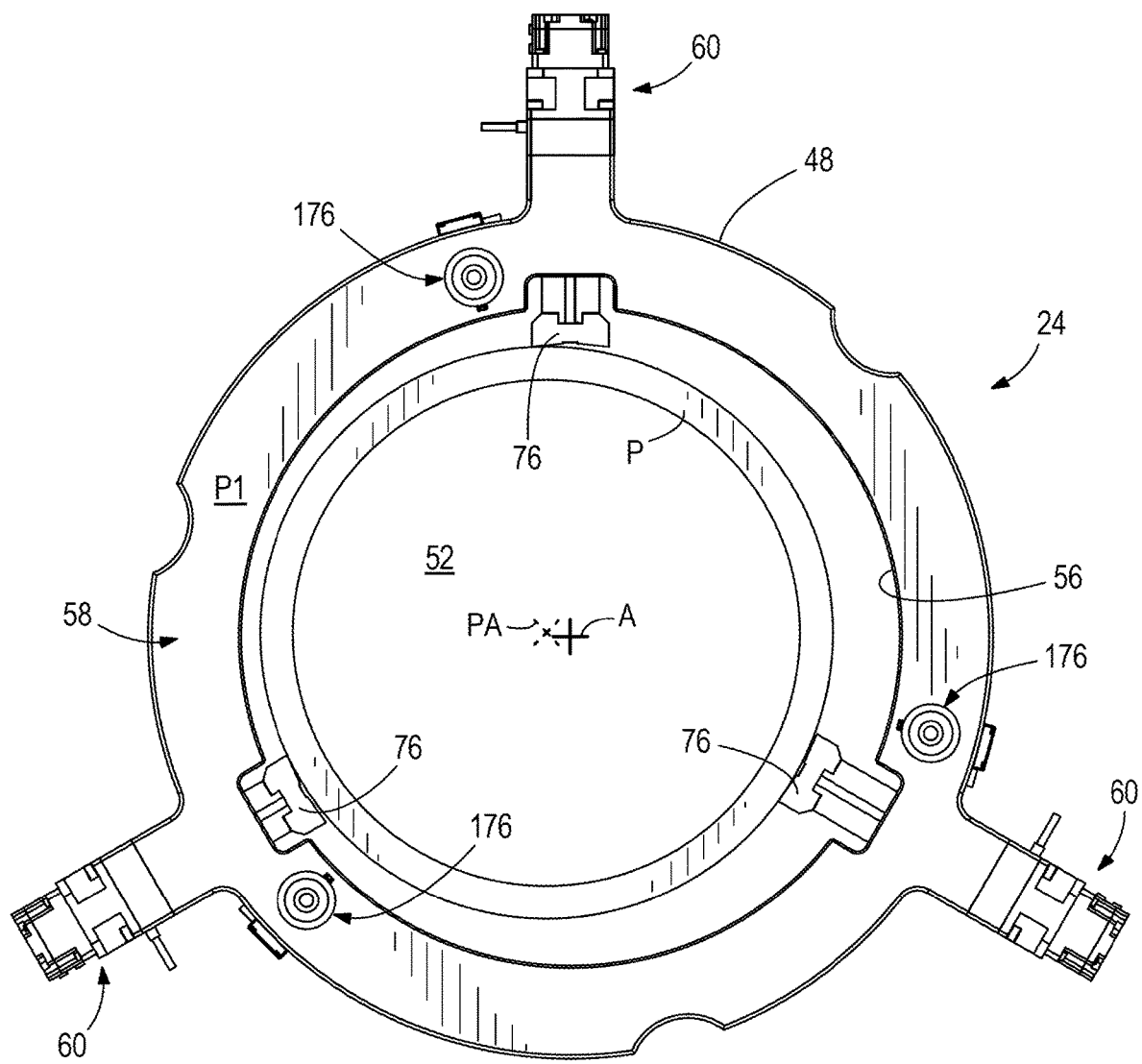
FIG. 4B is a front elevation view of the positioning apparatus with the pipe inserted therein and in a second position.

With continued reference to FIG. 1 and further reference to FIGS. 2-4, the positioning apparatus 24 is capable of being coupled to a pipe P. In the illustrated example, the positioning apparatus 24 may be coupled to exterior of a pipe P. The pipe P has a longitudinal central axis PA, as shown in FIGS. 4A and 4B. In other examples, the positioning apparatus 24 may be coupled to an interior of the pipe P. Referring back to the illustrated example, the positioning apparatus 24 has a frame 58 which is generally circular in shape and includes an exterior surface or circumference 50 and a general circular cavity 52 defined therein to provide an interior surface 56. In one example, the frame 58 of the positioning apparatus 24 may be comprised of a single, unitary member that is inserted over an end of a pipe P. In another example, the frame 58 may be comprised of two or more portions that are selectively coupled and uncoupled to position the portions around an exterior of a pipe P. This example may be referred to as a clam-shell style device.

Referring to FIGS. 1-4, the positioning apparatus 24 includes a plurality of coupling members or clamps 60 selectively movable toward and away from the pipe P to couple the positioning apparatus 24 to the pipe P. In the illustrated example, the positioning apparatus 24 includes three coupling members 60; however, it should be understood the positioning apparatus 24 may include any number of coupling members and still be within the spirit and scope of the present disclosure. Returning to the illustrated example, the coupling members 60 extend into the cavity 52 of the positioning apparatus 24 to engage an exterior of a pipe P. Alternatively, the coupling members 60 may be flipped or their orientation reversed such that the coupling members 60 extend beyond or to an exterior of the exterior surface or circumference 50 of the body 48 of the positioning apparatus 24. In such an alternative arrangement, the positioning apparatus 24 may be positioned in an interior of a pipe and the coupling members 60 may engage an interior of a pipe P. For convenience in explanation, the coupling members 60 are described in the orientation in which the coupling members 60 extend into the cavity 52 of the positioning apparatus 24 to engage an exterior of the pipe P.

The coupling members 60 may be either manually or auto/power actuatable to selectively engage and disengage a pipe P to couple and uncouple the positioning apparatus 24 to a pipe P. In some examples, the coupling members 60 are all manually actuatable. In other examples, the coupling members 60 are all auto/power actuatable. In further examples, some of the coupling members 60 are manually actuatable and some of the coupling members 60 are auto/power actuatable.

In examples where the coupling members 60 are manually actuatable, an operator engages the coupling members 60 with a tool and actuates the coupling members 60 with the tool to selectively engage or disengage the coupling members 60 with or from the pipe P as desired.

Figure 5:
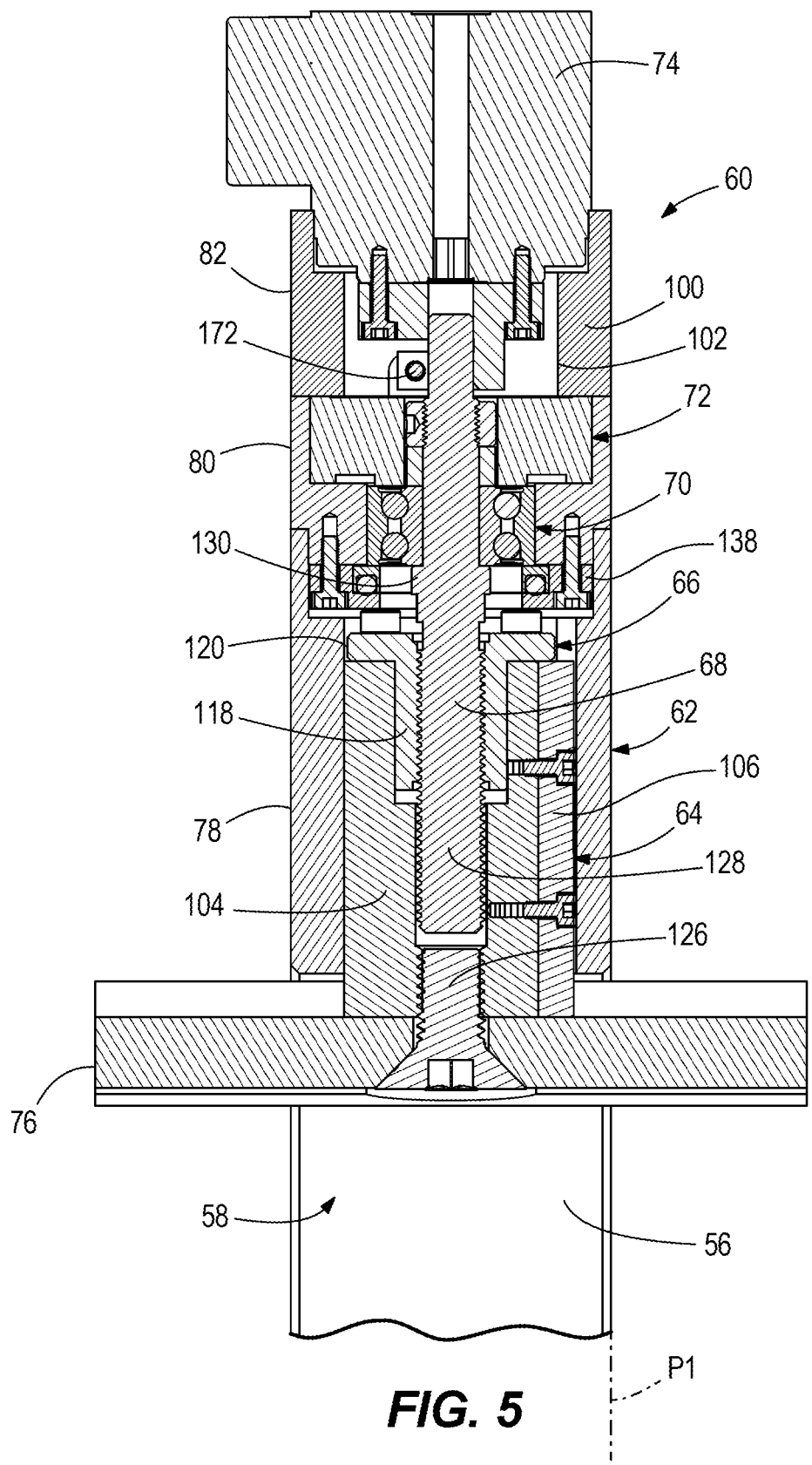
FIG. 5 is a cross-sectional view taken along line 5-5 in FIG. 4.
Figure 5A:
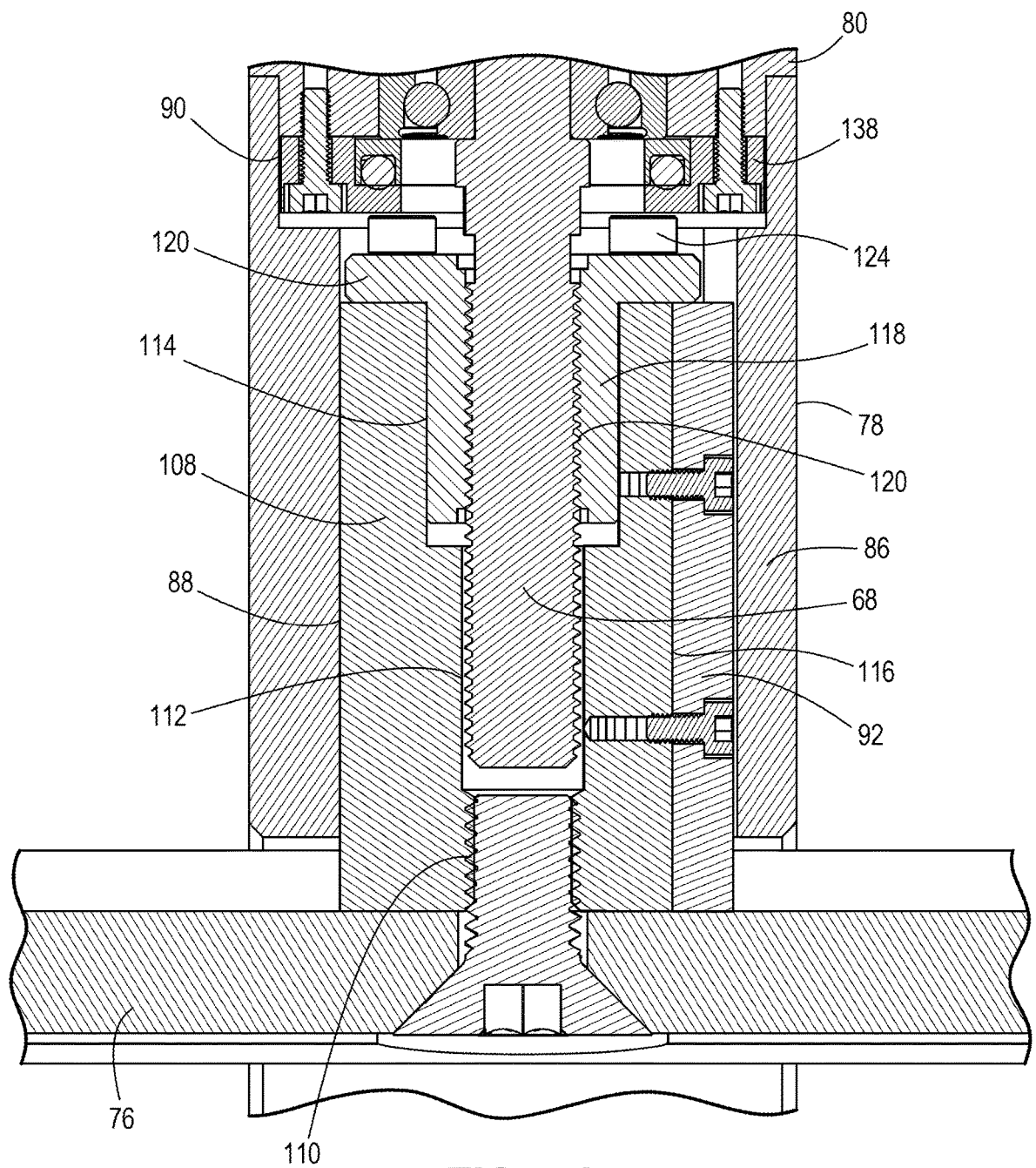
FIGS. 5A and 5B are enlarged views of portions of FIG. 5.
Figure 5B:
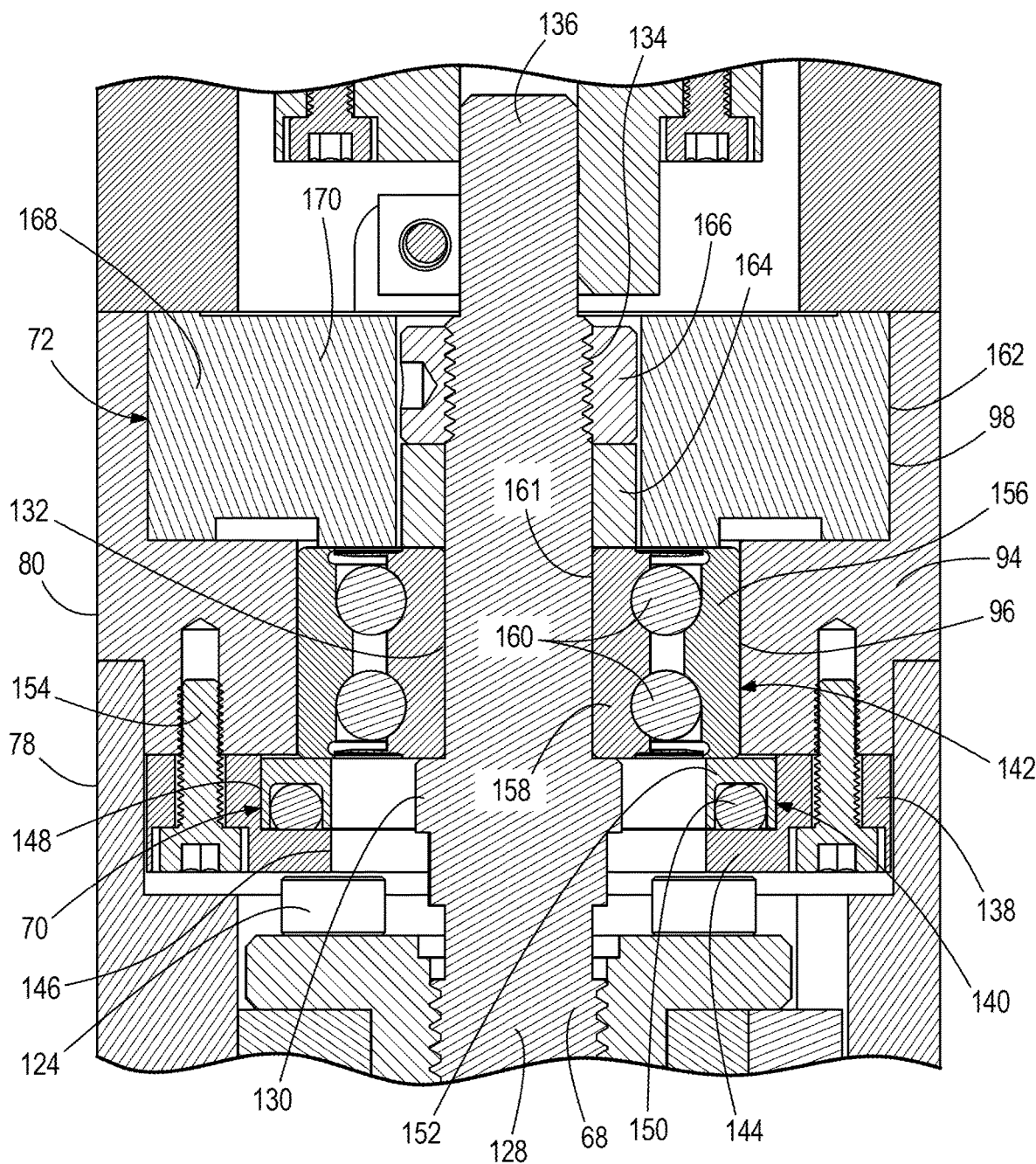

With continued reference to FIGS. 1-4 and additional reference to FIG. 5, the coupling members 60 are auto or power actuatable. In the illustrated example, all the coupling members 60 are similar in structure and function. Accordingly, only a single coupling member 60 will be described herein in detail with it being understood that the following description applies to all the coupling members 60.

With particular reference to FIG. 5, the coupling member 60 includes an outer housing 62 extending from the frame 58 having an inner housing assembly 64, a ball nut 66, a driven member 68 such as a ball screw, a bearing assembly 70, and a load cell assembly 72 mounted therein. The coupling member 60 further includes a drive member 74 attached to the outer housing 62 and coupled to the driven member 68 for imparting rotation to the driven member 68 as described herein. The coupling member 60 further includes a pad or foot 76 coupled to the inner housing assembly 64.

The outer housing 62 has a first lower housing section 78, a second intermediate housing section 80, and a third upper housing section 82, all of which are affixed together by suitable means, such as fasteners 84, see FIG. 1.

The lower housing section 78 is formed from a body 86 which extends from the frame 58 and is integrally formed therewith. A central passageway extends longitudinally through the body 86 from a lower end to an upper end thereof. The central passageway has a lower cylindrical passageway portion 88 which extends from the lower end of the body 86 upwardly, and an upper cylindrical passageway portion 90 which extends from the upper end of the lower passageway portion 88 to the upper end of the body 86. A keyway 92, which is in communication with the lower passageway portion 88, extends radially outward from the lower passageway portion 88 and extends longitudinally from the lower end of the lower passageway portion 88 to the upper end of the lower passageway portion 88.

The intermediate housing section 80 extends from the upper end of the lower housing section 78. The intermediate housing section 80 is formed from a body 94 having a central passageway extending longitudinally therethrough from a lower end to an upper end. The central passageway includes a lower cylindrical passageway portion 96 which extends from a lower end of the body 94, and an upper cylindrical passageway portion 98 extending longitudinally from the upper end of the lower passageway portion 96 to the upper end of the body 94. The upper passageway portion 98 has a diameter which is greater than a diameter of the lower passageway portion 96.

The upper housing section 82 extends from the upper end of the intermediate housing section 80. The upper housing section 82 is formed from a body 100 having a central passageway extending longitudinally therethrough from a lower end to an upper end. The central passageway 102 has a diameter which is less the diameter of the upper passageway portion 98 of the intermediate housing section 80.

The inner housing assembly 64 is formed from an inner housing 104 and a key 106 attached thereto.

The inner housing 104 is formed from a body 108 having an outer cylindrical surface and having a central passageway extending longitudinally therethrough from a lower end to an upper end. The central passageway has a lower cylindrical passageway portion 110 extending longitudinally from the lower end of the body 108, an intermediate cylindrical passageway portion 112 extending longitudinally from the upper end of the lower passageway portion 110, and an upper cylindrical passageway portion 114 extending longitudinally from the upper end of the intermediate passageway portion 112 to the upper end of the body 108. The lower passageway portion 110 has a first diameter and is threaded along its length. The intermediate passageway portion 112 has a second diameter which is greater than the first diameter, and is unthreaded along its length. The upper passageway portion 114 has a third diameter which is greater than the second diameter, and is unthreaded along its length. The body 108 has a recess 116 therein which extends radially inward from an outer surface of the body 108, but is not in communication with the central passageway formed by passageway portions 110, 112, 114. The recess 116 extends longitudinally from the lower end of the body 108 to the upper end of the body 108.

The key 106 seats within the recess 116 and is fixedly attached to the body 108. The key 106 extends radially outward from the outer surface of the body 108. In an alternate embodiment, the inner housing 104 and the key 106 are integrally formed.

The body 108 seats within the lower passageway portion 88 of the lower housing section 78 and extends downwardly from the lower end of the lower housing section 78. The key 106 seats within the keyway 92 of the lower housing section 78.

The ball nut 66 has a cylindrical body 118 having a threaded central passageway 120 extending longitudinally therethrough from a lower end to an upper end thereof. A mating flange 122 extends radially outward from the body 118. The body 118 seats partially within the upper passageway portion 114 of the inner housing 104 and extends outward from the upper end of the body 108 of the inner housing 104, such that the flange 122 abuts against the upper end of the body 108. The flange 122 is affixed to the upper end of the body 108 by suitable means, such as fasteners 124. The central passageway 120 of the ball nut 66 has the same diameter as the intermediate passageway portion 112 of the inner housing 104. As a result, the ball nut 66 and the inner housing assembly 64 cannot rotate relative to the lower housing section 78 of the outer housing 62, but the ball nut 66 and the inner housing assembly 64 can translate longitudinally relative to the lower housing section 78 of the outer housing 62.

The driven member 68 has a lower threaded portion 126 which extends longitudinally from a lower end thereof, a lower threaded intermediate portion 128 which extends longitudinally from an upper end of the lower threaded portion 126 to a flange 130 extending radially outwardly at upper end of the lower intermediate portion 128, a first upper intermediate unthreaded portion 132 extending longitudinally upwardly from the flange 130, a second upper intermediate threaded portion 134 extending longitudinally upwardly from the upper end of the first upper intermediate portion 132, and a drive member engaging end portion 136 extending longitudinally upwardly from the upper end of the second upper intermediate portion 134. The radially extending flange 130 provides a shoulder surface on which the bearing assembly 70 seats as described herein. The lower threaded intermediate portion 128 may have a diameter which is greater than the diameter of the lower threaded portion 126.

The bearing assembly 70 includes a bearing cover 138, an O-ring assembly 140 seated on the bearing cover 138, and a ring bearing 142 seated on the O-ring assembly 140.

The bearing cover 138 is formed from a body 144 having a central passageway extending longitudinally therethrough from a lower end to an upper end thereof. The central passageway has a lower cylindrical passageway portion 146 which extends from the lower end of the body 144, and an upper cylindrical passageway portion 148 which extends from the upper end of the lower passageway portion 146 to the upper end of the body 144. The lower passageway portion 146 has a diameter that is greater than the diameter of the central passageway 120 of the ball nut 66. The upper passageway portion 148 has a diameter which is greater than the diameter of the lower passageway portion 146.

The O-ring assembly 140 includes a flexible O-ring 150 that seats within, and is trapped by a ring-like retaining cup 152. The O-ring assembly 140 seats within the upper passageway portion 148 of the bearing cover 138, and the O-ring 150 seats against a lower surface of the wall forming the upper passageway portion 148. The bearing cover 138 is affixed to the intermediate housing section 80 by suitable means, such as fasteners 154, and is spaced from the heads of the fasteners 124 by an air gap. The retaining cup 152 engages the lower end of the intermediate housing section 80 such that the O-ring assembly 140 is secured between the intermediate housing section 80 and the bearing cover 138. A portion of the O-ring assembly 140 overlaps laterally into the lower passageway portion 96 of the intermediate housing section 80.

The ring bearing 142 includes an outer race 156 which seats on the upper end of the retaining cup 152 and abuts against the lower passageway portion 96 of the intermediate housing section 80, an inner race 158, and a plurality of ball bearings 160 mounted therebetween. The inner race 158 defines a cylindrical passageway 161 therethrough.

The driven member 68 is arranged perpendicular to a longitudinal central axis A (see FIGS. 1 and 2) extending through a center of the positioning apparatus 24. The threads of the lower intermediate portion 128 of the driven member 68 threadedly engages with the threads of the central passageway 120 of the ball nut 66. The wall forming the intermediate cylindrical passageway portion 112 of the inner housing 104 is spaced from the threads of the lower intermediate portion 128 of the driven member 68 such that the wall forming the intermediate cylindrical passageway portion 112 does not engage with threads of the driven member 68. The flange 130 seats inwardly of, and is spaced from, the retaining cup 152. The inner race 158 of the ring bearing 142 seats on the shoulder surface formed by the flange 130, and is secured to the intermediate portion 132 of the driven member 68.

The load cell assembly 72 seats within the upper passageway portion 98 of the intermediate housing section 80. The load cell assembly 72 includes a load cell 162, a spacer 164 mounted within a central passageway of the load cell 162 proximate to a lower end thereof, and a nut 166 mounted within the central passageway of the load cell 162 proximate to an upper end thereof and above the spacer 164. The spacer 164 and the nut 166 include central passageways therethrough. The spacer 164 surrounds the first upper intermediate unthreaded portion 132, and the nut 166 is threadedly engaged with the second upper intermediate threaded portion 134 of the driven member 68 and engages against the spacer 164. The nut 166 biases the spacer 164 into engagement with the inner race 158 of the ring bearing 142 to lock the inner race 158 between the spacer 164 and the flange 130 of the driven member 68. An outer part 168 of the load cell 162 is clamped between a lower end of the upper housing section 82 and a lower wall which forms the upper passageway portion 98 of the intermediate housing section 80. A working part 170 of the load cell 162 is not clamped therebetween and overlaps and is in contact with the outer race 156 of the ring bearing 142. Since the retaining cup 152 floats under action of the O-ring 150, the retaining cup 152 biases the outer race 156 of the ring bearing 142 into contact with the working part 170 of the load cell 162.

The foot 76 is threadedly attached to the lower passageway portion 110 of the inner housing 104, and is positioned in the cavity 52 of the positioning apparatus 24 such that the foot 76 extends inward of the interior surface 56 of the positioning apparatus 24. In the illustrated example, the foot 76 is fastened to the inner housing 104. Alternatively, the foot 76 may be coupled to the inner housing 104 in a variety of other manners including, but not limited to, welded, bonded, adhered, unitarily-formed as one-piece, or any other manner.

The drive member 74 includes a coupling 172 that attaches the driven member 68 to the drive member 74 such that the driven member 68 rotates under action of the drive member 74. The drive member 74 is affixed to the upper housing section 82 by suitable means, such as fasteners 174, see FIG. 1.

When the driven member 68 is rotated by the drive member 74, the driven member 68 rotates relative to the nut 166 and to the spacer 164. The inner race 158 rotates with the driven member 68 and relative to the outer race 156 via the ball bearings 160. When the driven member 68 is rotated, the ball nut 66, the inner housing 104 and the foot 76 translate longitudinally along the driven member 68 and within the lower housing section 78. The direction of rotation of the driven member 68 determines whether the ball nut 66, the inner housing 104 and the foot 76 translates away from the drive member 74 or toward the drive member 74. The driven member 68 is rotated until the foot 76 engages with the pipe P.

The load cell 162 is configured to determine a load on the coupling member 60. The force of the load created by the interengagement of the foot 76 with the pipe P is transmitted from the foot 76, through the inner housing 104, through the ball nut 66, through the driven member 68 and through its flange 130, through the inner race 158, through the ball bearings 160, and to the outer race 156. The outer race 156 is in contact with the working part 170 of the load cell 162. Such a load is important when engaging a pipe P with the foot 76 because a predetermined quantity of load or force may be desired to ensure an adequate engagement or coupling of the coupling member 60 to the pipe P. Thus, the drive member 74 is actuated until the foot 76 applies a certain load to the pipe P. When the appropriate load is determined by the working part 170 of the load cell 162, the drive member 74 stops rotating the driven member 68.

The drive member 74 drives the foot 76 of each coupling member 60 in a radial direction relative to the longitudinal central axis A of the positioning apparatus 24 and the longitudinal central axis PA of the pipe P to which the positioning apparatus 24 is coupled. The drive member 74 of each coupling member 60 is actuated until the respective foot 76 applies a certain load to the pipe P. When each foot 76 is extended the same amount, the longitudinal central axis A of the positioning apparatus 24 and the longitudinal central axis PA of the pipe P align with each other. In order to offset the longitudinal central axis A of the positioning apparatus 24 relative to the longitudinal central axis PA of the pipe P, certain ones of the feet 76 are thereafter driven outwardly from the respective outer housings 62 while other ones of the feet 76 are driven inwardly into the respective outer housings 62, while maintaining the load on the pipe P. This is accomplished by use of the encoder of the servomotor used as the drive member 74 which communicates with a controller 268, described herein, to maintain the proper force on the pipe P when the axes P and PA are offset from each other.

The drive member 74 may be a wide variety of drive members and all of such possibilities are intended to be within the spirit and scope of the present disclosure. In the illustrated example, the drive member 74 is a servomotor. In other examples, the drive member 74 may be a hydraulic drive member, powered by another fluid, or a variety of other types of drive members.

Referring to FIGS. 1-4, the positioning apparatus 24 also includes a plurality of adjustment members 176 configured to be coupled to the pipe machining apparatus 28 and adjust a position of the pipe machining apparatus 28 relative to the positioning apparatus 24 and a pipe P. The adjustment members 176 may be either manually or auto/power actuatable to selectively adjust a position of the pipe machining apparatus 28. In some examples, the adjustment members 176 are all manually actuatable. In other examples, the adjustment members 176 are all auto/power actuatable. In further examples, some of the adjustment members 176 are manually actuatable and some of the adjustment members 176 are auto/power actuatable.

In examples where the adjustment members 176 are manually actuatable, an operator engages the adjustment members 176 with a tool and actuates the adjustment members 176 with the tool to adjust the position of the pipe machining apparatus 28.

Figure 6:
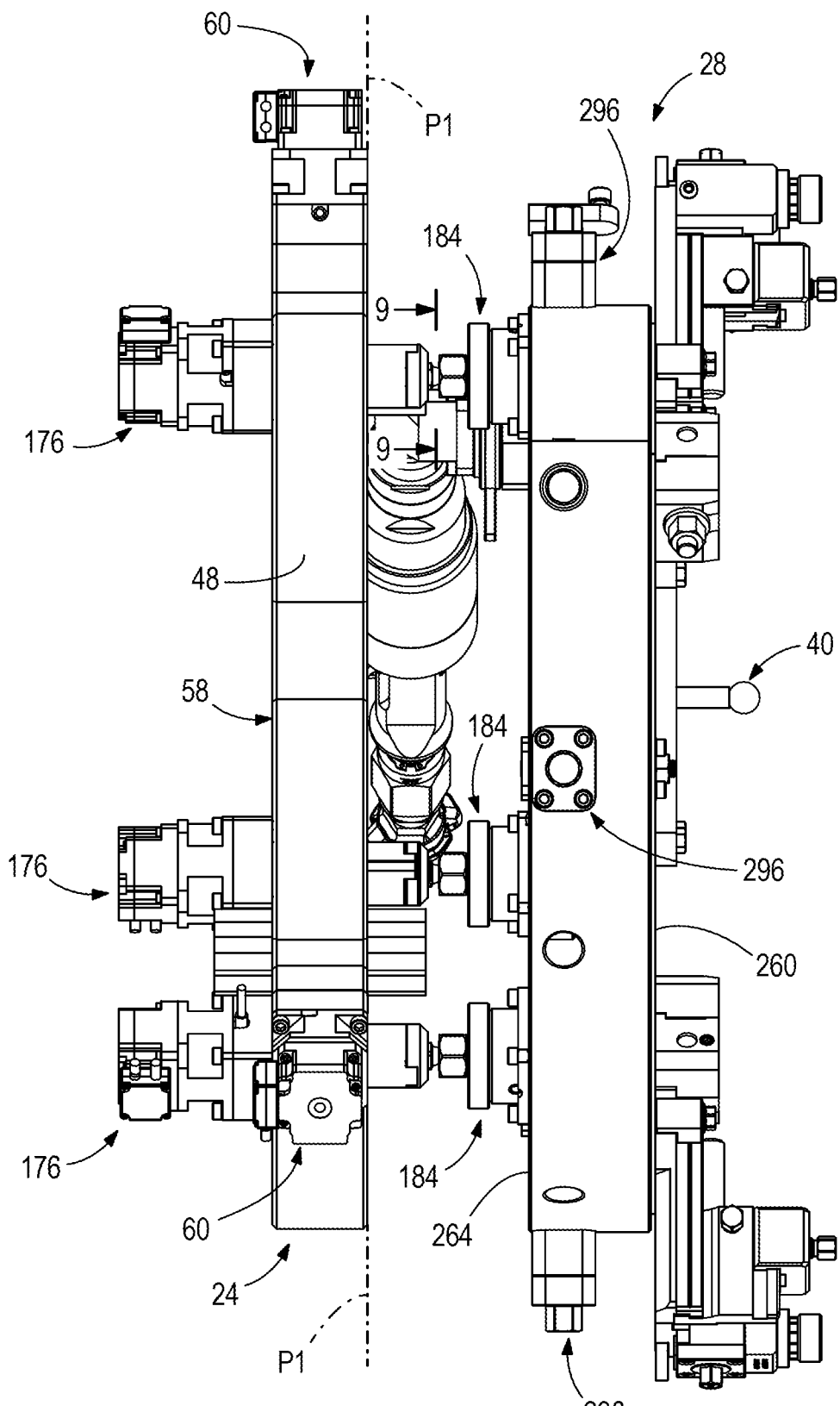
FIG. 6 is a right side elevation view of the positioning apparatus and the pipe machining apparatus.
Figure 7:
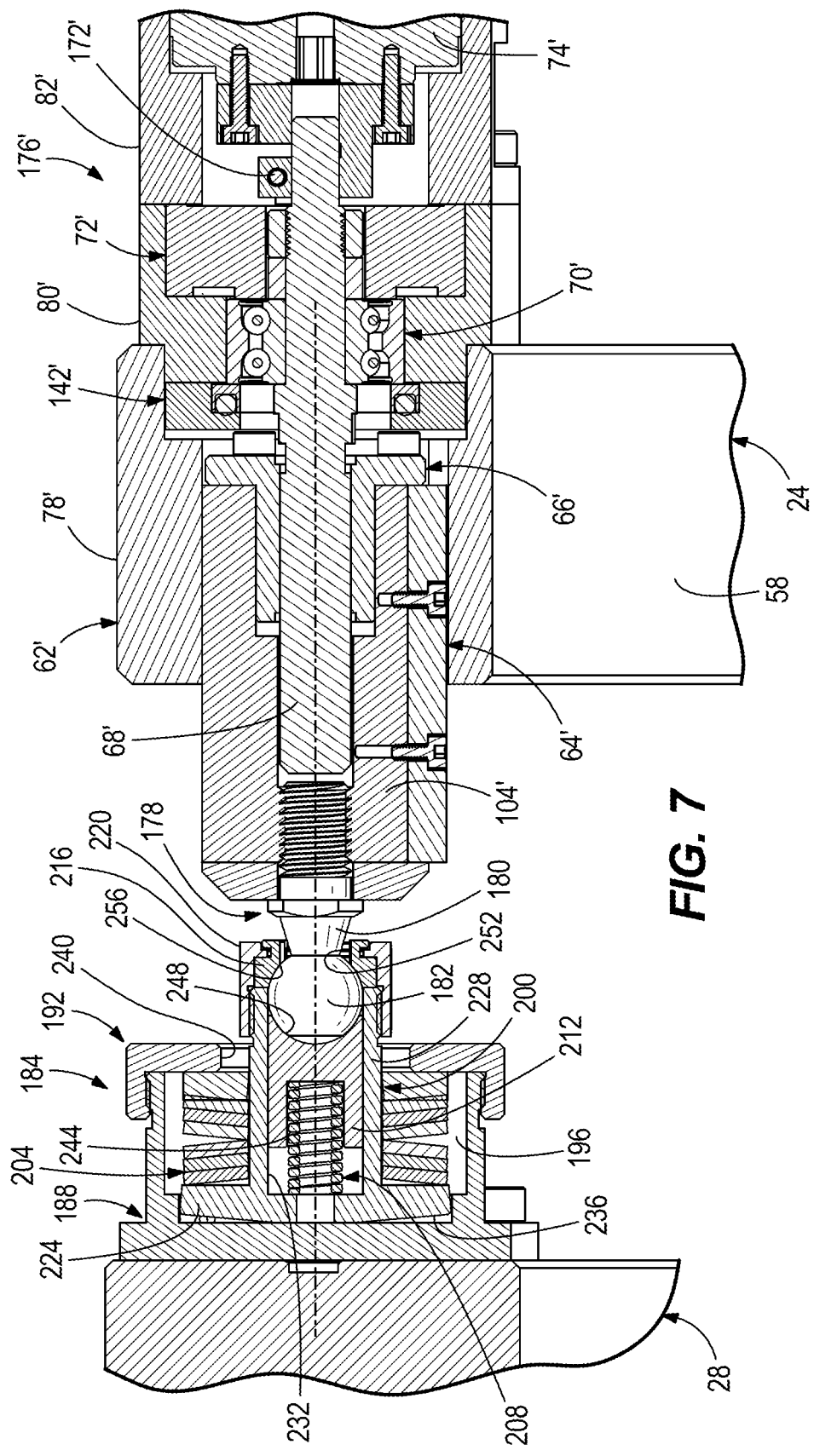
FIG. 7 is a cross-sectional view taken along line 7-7 in FIG. 4 showing a portion of the positioning apparatus and a portion of the pipe machining apparatus in a first position.
Figure 8:
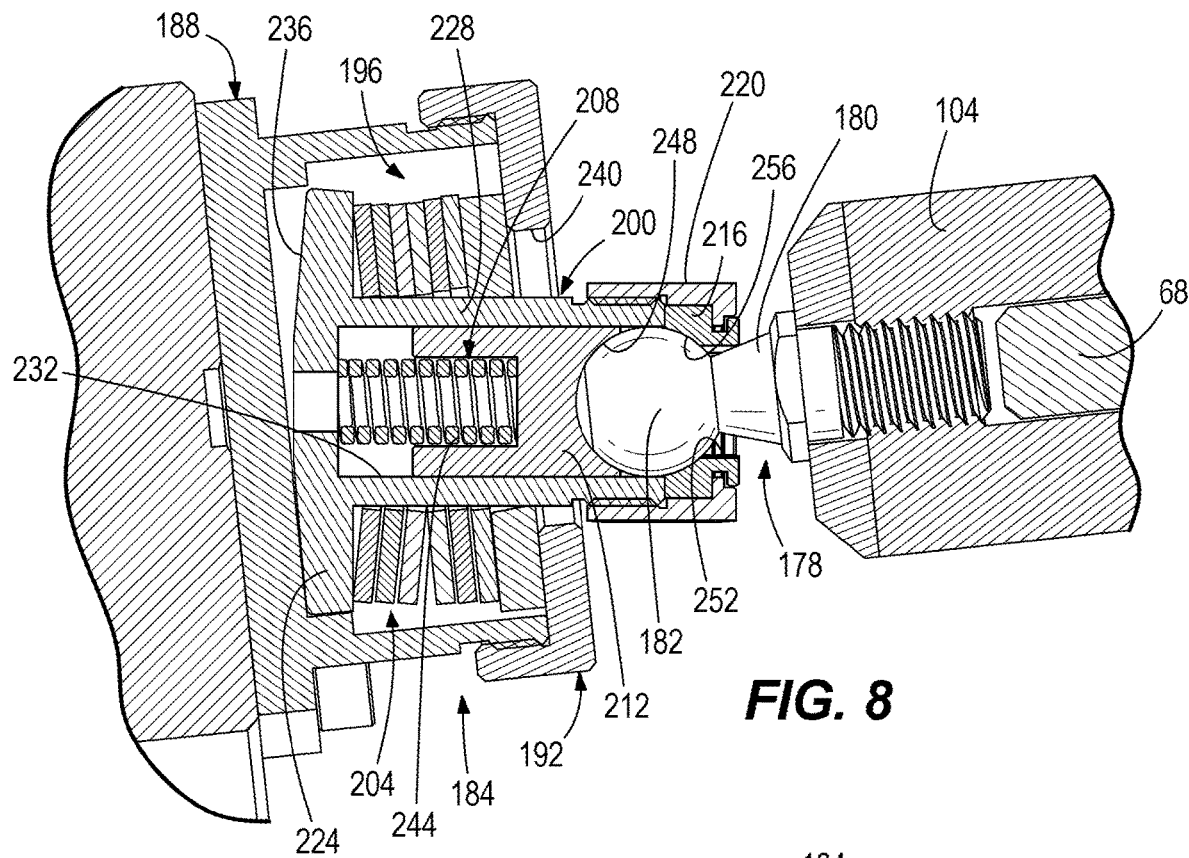
FIG. 8 is a cross-sectional view similar to FIG. 7 with a portion of the positioning apparatus and a portion of the pipe machining apparatus shown in a second position.

With continued reference to FIGS. 1-4 and additional reference to FIGS. 6-8, the adjustment members 176 are auto or power actuatable and are identical in structure and function to the coupling members 60, except for the differences noted herein. As such, like elements are denoted with like reference numerals, but with a prime after the reference numeral. In the illustrated example, all of the adjustment members 176 are similar in structure and function to each other. Accordingly, only one of the adjustment members 176 will be described herein in detail with it being understood that the following description applies to all of the adjustment members 176.

Each adjustment member 176 is identical to the coupling member 60 except that the driven member 68' is arranged parallel to the longitudinal central axis A of the positioning apparatus 24, and that instead of a foot 76, the adjustment member 176 includes a connector 178 configured to connect or couple to the pipe machining apparatus 28. The connector 178 is rigidly connected to an end of the inner housing 104' and translates with the inner housing 104'. The connector 178 includes a frusto-conical or tapered portion 180 and an engagement member or ball member 182. The drive member 74' rotates the driven member 68' in either direction, which causes the driven member 68', the inner housing 104' and the connector 178 to selectively extend or retract relative to the drive member 74'. In the illustrated example, the drive members 74' of the adjustment members 176 extend and retract the connectors 178 in an axial direction relative to the longitudinal central axis A. In other words, the drive members 74' extend and retract the connectors 178 in a direction parallel to the longitudinal central axis A.

With continued reference to FIGS. 1-4 and 6-8, the illustrated example of the positioning apparatus 24 includes three adjustment members 176. In other examples, the positioning apparatus 24 may include any number of adjustment members 176. Furthermore, the positioning apparatus 24 is capable of including adjustment members 176 with different structure and/or function than the coupling members 60 and all of such possibilities are intended to be within the spirit and scope of the present disclosure.

Referring now to FIGS. 3 and 6-8, the pipe machining apparatus 28 includes a plurality of connection members 184 configured to connect or couple to a respective one of the connectors 178 of the adjustment members 176. The positioning apparatus 24 and the pipe machining apparatus 28 include a complementary number of connectors 178 and connection members 184. In the illustrated example, the pipe machining apparatus 28 includes three connection members 184, but is capable of including any number of connection members 184 to accommodate any number of connectors 178. In the illustrated example, the connection members 184 are substantially similar in structure and function. Accordingly, only one of the connection members 184 will be described herein in detail with it being understood that the description herein is intended to apply to all the connection members 184.

With particular reference to FIG. 7, the connection member 184 includes a housing 188 mounted on the frame 46 of the pipe machining apparatus 28, a cap 192 threadably coupled to the housing 188, a cavity 196 defined within the housing 188 and the cap 192, an arm 200, a first biasing member 204, a second biasing member 208, a first socket member 212, a second socket member 216, and a socket cap 220. The arm 200 includes a base 224 engaging the housing 188 and a projection 228 extending from the base 224. The first biasing member 204 is positioned in the cavity 196 defined by the housing 188 and the cap 192, and is compressed between the cap 192 and the base 224. A projection cavity 232 is defined in the projection 228. In the illustrated example, the base 224 has a curved or semi-spherical surface 236 engaging the housing 188 to facilitate a three-dimensional rocking motion. The first biasing member 204 applies a force to the base 224 and, therefore, to the arm 200 to position the arm 200 in a centered location as shown in FIG. 7. The cap 192 defines an opening 240 therein and the projection 228 extends though and out of the opening 240. An end of the projection 228 external the cap 192 includes threads thereon. The socket cap 220 includes first threads complementary to the projection threads and threadably engages the external end of the projection 228. The first socket member 212 and the second biasing member 208 are positioned in the projection cavity 232 with the second biasing member 208 compressed between the base 224 and the first socket member 212. The first socket member 212 defines a receptacle 244 for receiving a portion of the second biasing member 208. The receptacle 244 assists with maintaining proper alignment of the second biasing member 208 relative to the first socket member 212 and the base 224. The first socket member 212 defines a first concave surface 248 therein configured to engage and receive a portion of the ball member 182 of the connector 178. The second socket member 216 includes threads that threadably engage second threads of the socket cap 220, a second socket cavity 252, and a second concave surface 256. The connector 178 is positioned in and extends through the second socket cavity 252. The second concave surface 256 is configured to engage and receive a portion of the ball member 182 of the connector 178. With the socket cap 220 threaded to the arm, a socket is formed by the first and second concave surfaces 248, 256, the ball member 182 is positioned in the socket, and the connector 178 is coupled or secured to the connection member 184.

With particular reference to FIGS. 7 and 8, as indicated above, the adjustment member 176 is configured to translate, which causes the connector 178 to translate. When the connector 178 translates, the connector 178 applies a force to the connection member 184, which applies a force to the pipe machining apparatus 28. As a result, the pipe machining apparatus 28 will move. The positioning apparatus 24 includes a plurality of adjustment members 176, which are configured to be operated independently of each other. This means in some instances only one or two of the adjustment members 176 may be actuated, which results in the pipe machining apparatus 28 angling or tilting relative to the positioning apparatus 24 (conversely, if all the adjustment members 176 were activated at the same time and the same amount, the pipe machining apparatus 28 would maintain its orientation relative to the positioning apparatus 24 and would merely move straight away from or straight toward the positioning apparatus 24).

Moreover, the positioning apparatus 24 may define a plane P1 parallel to front and rear surfaces of the positioning apparatus 24 and/or co-planar with one of the front or rear surfaces (co-planar with the front surface in FIGS. 1-4 and 6). Similarly, the pipe machining apparatus 28 may define the cutting plane CP (as described above) in line with the cutting tool and parallel to front and rear surfaces 260, 264 of the pipe machining apparatus 28. Any number of the adjustment members 176 can be actuated to move the cutting plane CP of the pipe machining apparatus 28 relative to the plane P1 of the positioning apparatus 24. In some examples, one or more of the adjustment members 176 may be actuated to position the cutting plane CP parallel to the plane P1. In other examples, one or more of the adjustment members 176 and the coupling members 60 may be actuated to position the cutting plane CP transverse or non-parallel to the plane P1, while maintaining the longitudinal axis B of the pipe machining apparatus 28 aligned with the longitudinal axis PA of the pipe P.

In examples where the two planes CP, P1 are non-parallel, the tilting of the pipe machining apparatus 28 relative to the positioning apparatus 24 may occur in any direction in a three-dimensional coordinate system. Thus, the coupling between the connector 178 and the connection member 184 must be configured to accommodate movement in three dimensions or along three-dimensional axes. The spherical nature of the ball member 182 and the complementary socket formed by the first and second concave surfaces 248, 256 facilitate movement in three dimensions.

With particular reference to FIG. 8, one example of a tilted position of the pipe machining apparatus 28 relative to the positioning apparatus 24 is shown. In this exemplary position, the arm 200 is no longer longitudinally aligned with the connector 178. Rather, the arm 200 is tilted or at an angle to the longitudinal extent of the connector 178. The frusto-conical or tapered portion 180 of the connector 178 along with the second socket cavity 252 in the second socket member 216 allow the connector 178 to move relative to the arm 200. Additionally, the opening 240 defined in the cap 192 is sufficiently sized to allow the arm 200 to move a necessary amount relative to the cap 192 and the housing 188. The curved or semi-spherical surface 236 of the base 224 rocks against the base 224 and also allows three dimensions of movement (or along three axes) of the arm 200 and associated components relative to the housing 188 and the pipe machining apparatus 28. As the connector 178 retracts (movement to the right as viewed in FIG. 8), the force applied to the connection member 184 is removed or lessened, and the first and second biasing members 204, 208 bias the components of the connection member 184 to their at rest and longitudinally aligned positions illustrated in FIG. 7. Accordingly, the interaction between the connector 178 and the connection member 184 facilitates three-dimensions of movement of the pipe machining apparatus 28 relative to the positioning apparatus 24.

Figure 9:
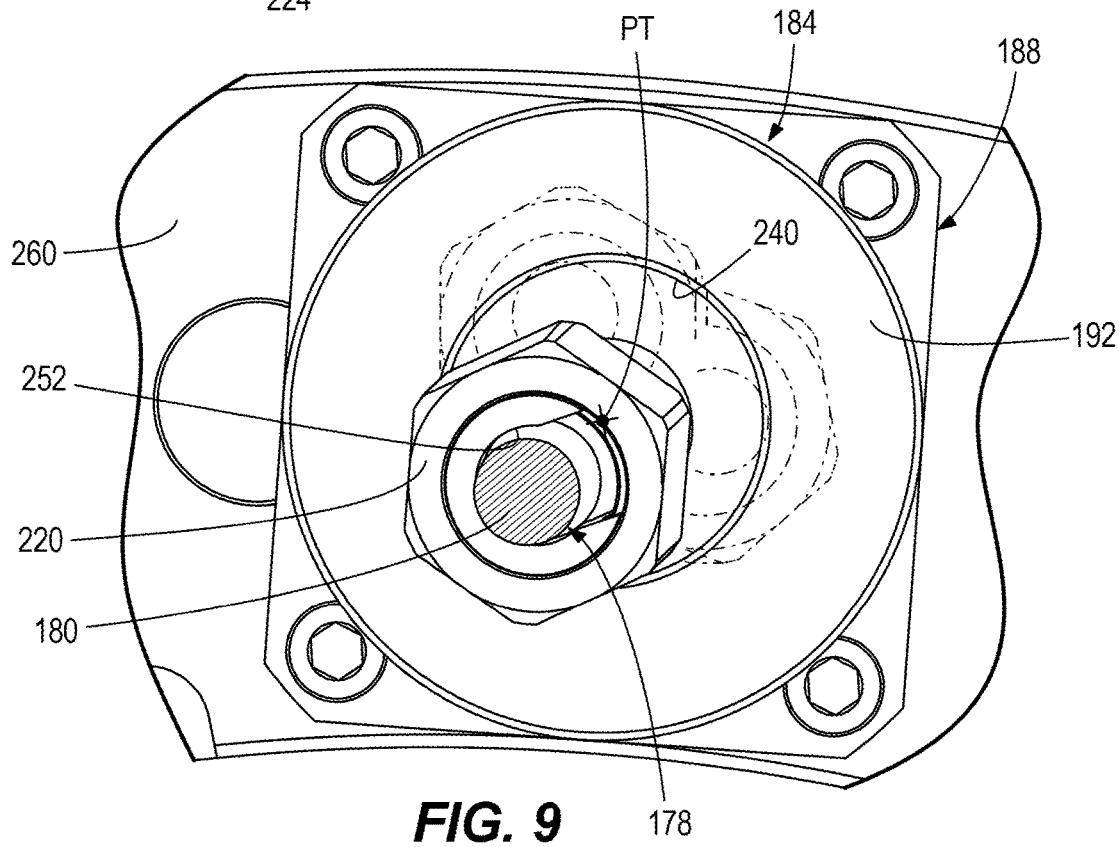
FIG. 9 is a cross-sectional view taken along line 9-9 in FIG. 6 showing a portion of the pipe machining apparatus in a variety of positions relative to the positioning apparatus.

Referring to FIG. 9, a cross-sectional view of a portion of the connector 178 and the connection member 184 is illustrated. In this figure, a plurality of examples of positions of the connection and connection member 184 are shown. This figure demonstrates the principle of three-dimensional movement of the connector 178 and the connection member 184. Point PT illustrated in FIG. 9 represents a centered, at rest position of the connector 178 and the connection member 184 as illustrated in FIG. 7.

Figure 15A:
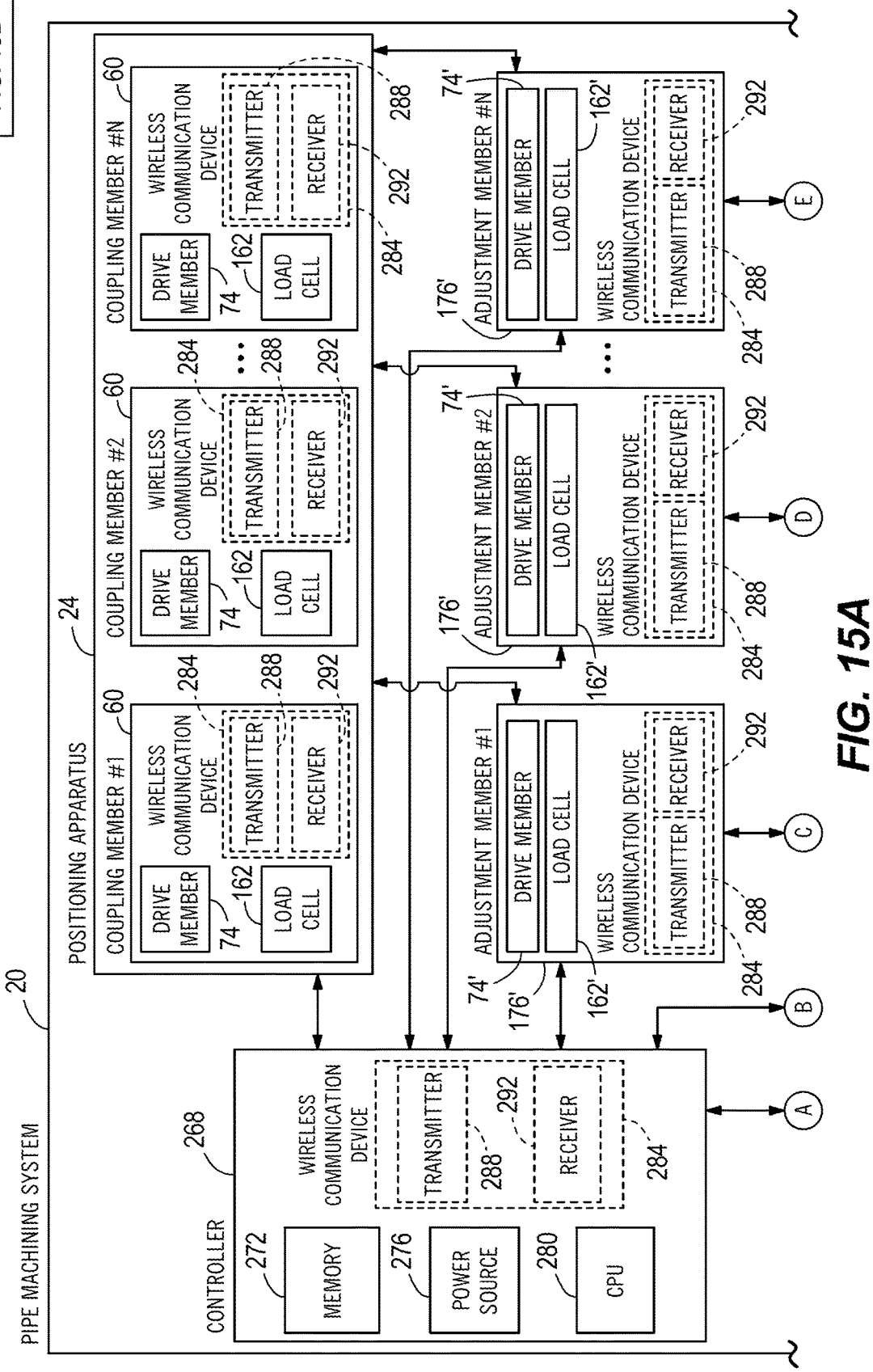
FIGS. 15A and 15B together represent a schematic view of one example of the pipe machining system of the present disclosure.
Figure 15B:
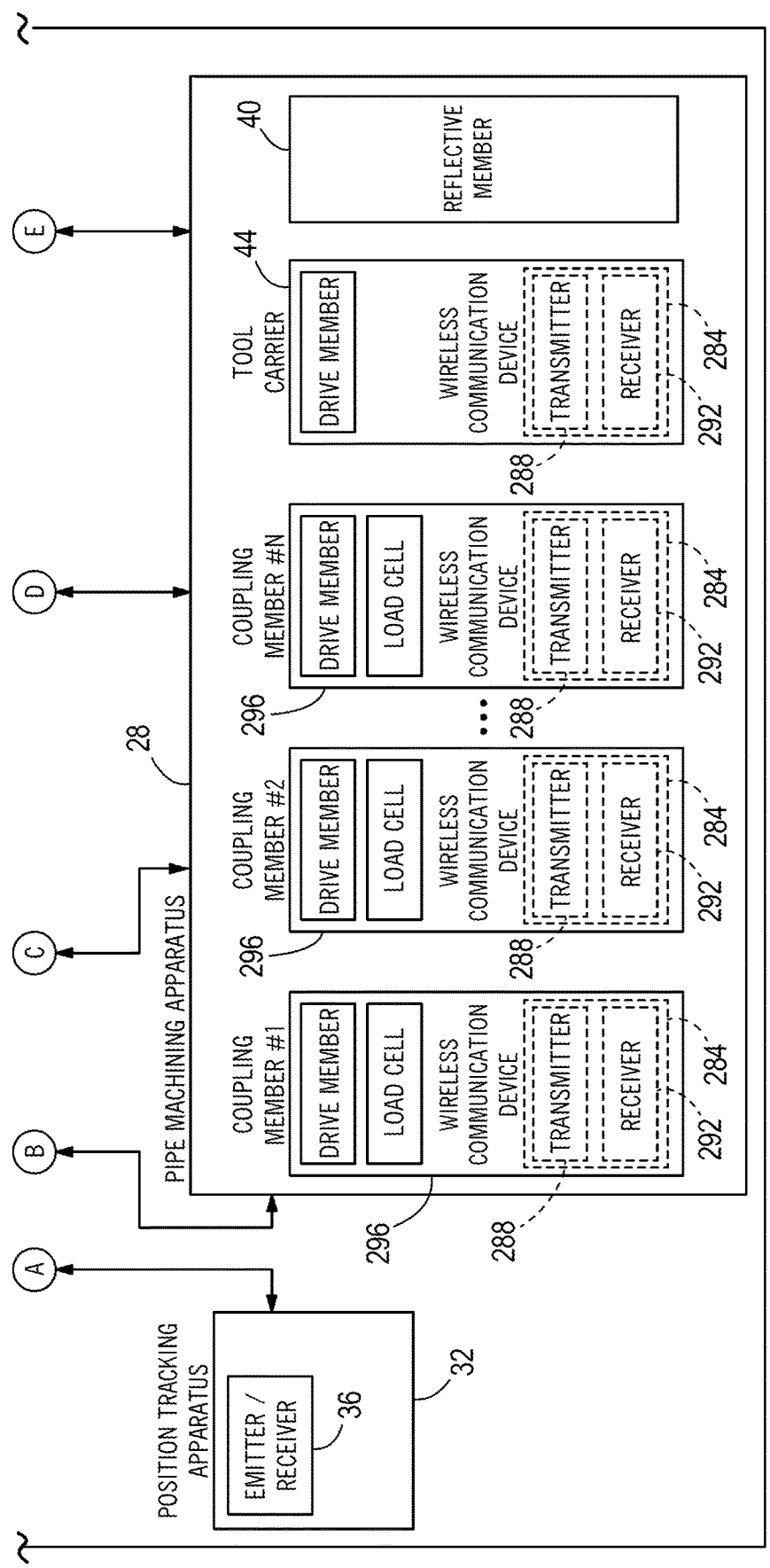

With reference to FIGS. 15A and 15B, one example of the pipe machining system 20 is illustrated. It should be understood the illustrated example of the pipe machining system 20 is provided to demonstrate at least some of the principles of the present disclosure and is not intended to be limiting upon the present disclosure. The pipe machining system 20 is capable of having a variety of other configurations, components, and functionality, and all of such possibilities are intended to be within the spirit and scope of the present disclosure.

In one example, the pipe machining system 20 includes the positioning apparatus 24, the pipe machining apparatus 28, the position tracking apparatus 32, the plurality of adjustment members 176, and a controller 268. The controller 268 is in electrical communication with the positioning apparatus 24, the pipe machining apparatus 28, the position tracking apparatus 32, and the plurality of adjustment members 176, and is capable of receiving data from and transmitting data to these components. The controller 268 is configured to receive data, interpret the data, and output data to the components of the system 20 in order to control the components as desired such that components act. The controller 268 may be a conventional controller configured to perform all the necessary functionality of the pipe machining system 20 and, accordingly, the controller 268 is configured to include all the necessary hardware and software to achieve the necessary functionality.

In one example, the controller 268 includes, but is not limited to, memory 272, a power source 276, and a central processing unit (CPU) 280. The controller 268 may include more or less components and all of such possibilities are intended to be within the spirit and scope of the present disclosure. The exemplary components of the controller 268 identified in the present disclosure are merely examples of some of the various possible components and are provided to demonstrate at least some of the principles of the present disclosure.

The controller 268 is capable of being in electrical communication with the various components of the pipe machining system 20 in a variety of manners and all of such possibilities are intended to be within the spirit and scope of the present disclosure. For example, the controller 268 may be in electrical communication with the components via a wired connection comprised of one or more wires. In other examples, the controller 268 may be in electrical communication with the components via a wireless connection. In such wireless examples, the controller 268 includes a wireless communication device 284 including, but not limited to, a transmitter 288 and a receiver 292. Similarly, in such wireless examples, the various components of the pipe machining system 20 may include a similar wireless communication device 284 including, but not limited to, a transmitter 288 and a receiver 292. These wireless communication devices would facilitate wireless communication between the components of the pipe machining system 20. In further examples, the controller 268 may be in electrical communication with the components of the pipe machining system 20 with a combination of wired and wireless connections.

In some examples, the controller 268 is in electrical communication with the positioning apparatus 24 to communicate data to the positioning apparatus 24 to actuate the drive members 74 of the coupling members 60 as desired. The controller 268 is also in electrical communication with the load cells 162 in the coupling members 60 to receive feedback data from the amount of force applied to the pipe P by the coupling members 60. When the coupling members 60 apply a desired amount of force, the controller 268 communicates data to the coupling members 60 to stop further actuation of the coupling members 60. Similarly, the controller 268 is in electrical communication with the coupling members 60 to withdraw or disengage the coupling members 60 from the pipe P.

In some examples, the controller 268 is in communication with the plurality of adjustment members 176 to communicate data to and receive data from the adjustment members 176 to actuate the drive members 74' of the adjustment members 176 as desired. The controller 268 is also in electrical communication with the position tracking apparatus 32 to communicate data to and receive data from the position tracking apparatus 32. The position tracking apparatus 32 is coupled to the pipe machining apparatus 28. The data received by the position tracking apparatus 32 is associated with the position of the reflective member 40 and, therefore, the position of the pipe machining apparatus 28 and/or the position of the cutting plane CP. The controller 268 electrically communicates with the position tracking apparatus 32 to receive data associated with the position of the reflective member 40. The controller 268 includes data associated with the desired position of the pipe machining apparatus 28 and determines if the pipe machining apparatus 28 and/or the cutting plane CP, via the reflective member 40, is/are positioned in the desired position. If the pipe machining apparatus 28/cutting plane CP and the reflective member 40 are not in the desired position, the controller 268 communicates data to one or more of the adjustment members 176 to move the pipe machining apparatus 28 and cutting plane CP into the desired position. When the pipe machining apparatus 28 and/or the cutting plane CP is/are in the desired position, the controller 268 communicates data to the one or more adjustment members 176 to stop actuation of the one or more drive members 74' associated with the one or more adjustment members 176.

In some examples, the controller 268 is in electrical communication with coupling members 296 of the pipe machining apparatus 28. In such examples, with the pipe machining apparatus 28 in the desired position, the controller 268 electrically communicates data to the coupling members 296 of the pipe machining apparatus 28 to actuate the drive members of the coupling members 296. The coupling members 296 of the pipe machining apparatus 28 may include load cells. The controller 268 may receive feedback data from the load cells associated with the amount of force applied to the pipe P by the coupling members 296. When the coupling members 296 apply a desired amount of force to the pipe P, the controller 268 communicates data to the drive members of the coupling members 296 to stop further actuation of the coupling members 296. The pipe machining apparatus 28 is now ready for operation.

The position of the pipe machining apparatus 28 may be determined in a variety of manners by using the reflective member 40 and the position tracking apparatus 32. In one example, the pipe machining apparatus 28 may activate one or more revolutions of the tool carrier 44, which is the portion of the pipe machining apparatus 28 that carries the cutting tool and the reflective member 40. The position tracking apparatus 32 tracks movement of the reflective member 40 as it moves through the one or more revolutions. The position tracking apparatus 32 then communicates data associated with the revolution(s) of the reflective member 40 to the controller 268 and the controller 268 reacts as needed. In other examples, the position of the pipe machining apparatus 28 may be determined with the reflective member 40 being stationary and the position tracking apparatus 32 determining the position of the reflective member 40 when stationary. The position tracking apparatus 32 then communicates data to the controller 268 pertaining to the position of the reflective member 40. The controller 268 than can take action as needed.

Referring now to FIGS. 10-14, one example of a mounting process of the system 20 is illustrated. It should be understood this exemplary process is only one example of a variety of mounting process that may be used to mount the system 20 to a pipe P, and all of such possibilities are intended to be within the spirit and scope of the present disclosure.

Figure 10:
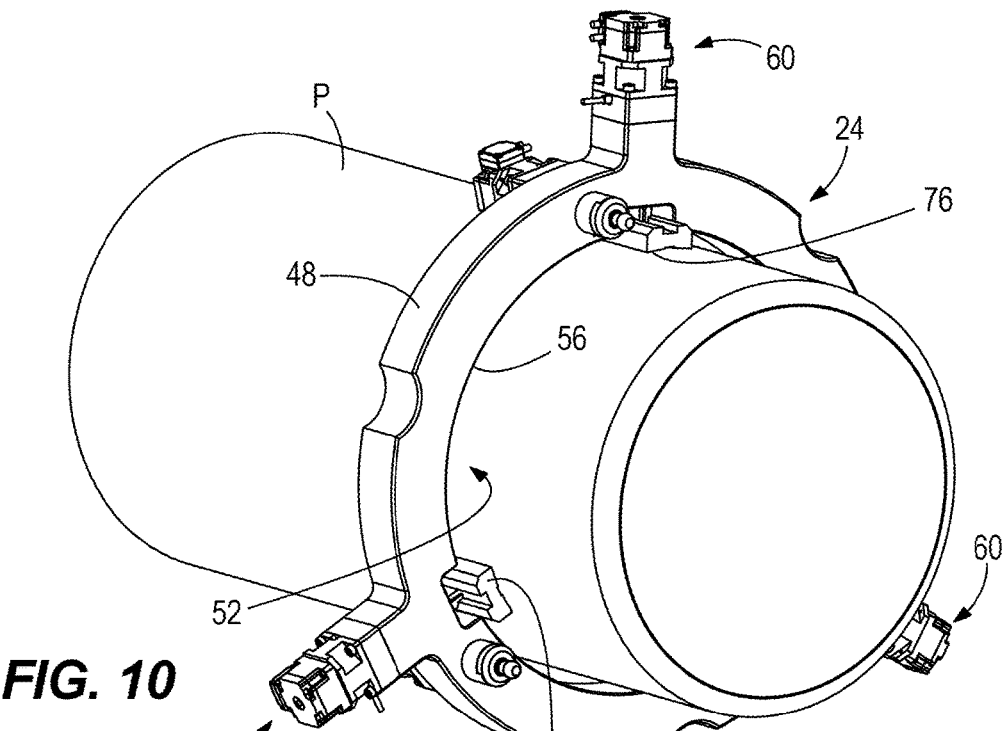
FIG. 10 is a top, front perspective view of one example of a pipe and the positioning apparatus with the positioning apparatus coupled to the pipe.

With reference to FIG. 10, the positioning apparatus 24 is positioned around a pipe P. The controller 268 actuates the coupling members 60 to engage an exterior of the pipe P to secure the positioning apparatus 24 to the pipe P with the desired load on by each foot. The positioning apparatus 24 is centered around the pipe P such that the positioning apparatus 24 is concentric with the pipe P and the longitudinal central axes A, PA align with each other.

Figure 11:
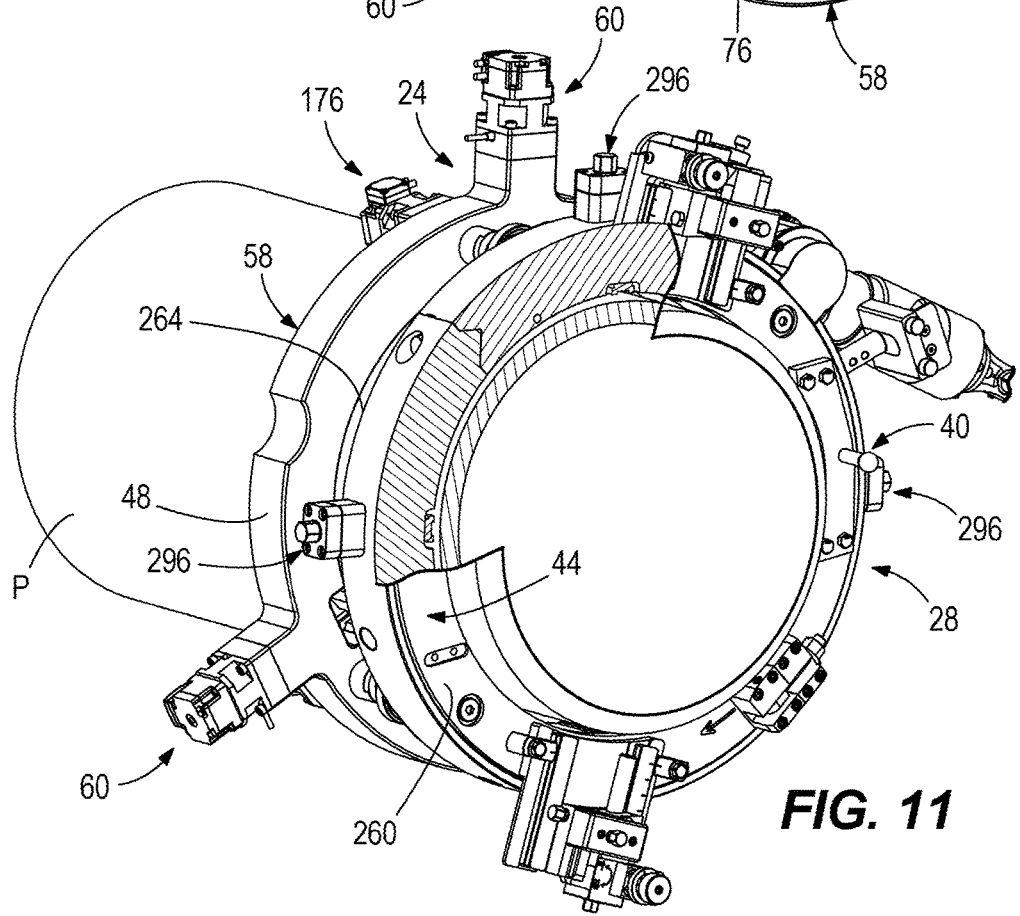
FIG. 11 is a top, front perspective view of the positioning apparatus and the pipe machining apparatus coupled to the positioning apparatus but not yet coupled to the pipe as demonstrated, for example, by clamps of the pipe machining apparatus being displaced from and disengaged with the pipe as can be seen by the cutaway portion of the pipe machining apparatus.

Referring now to FIGS. 10 and 11, once the positioning apparatus 24 is coupled to the pipe P, the pipe machining apparatus 28 is coupled to the positioning apparatus 24 via the adjustment members 176. The connectors 178 of the adjustment members 176 are coupled to respective connection members 184 of the pipe machining apparatus 28. The pipe machining apparatus 28 includes a plurality of coupling members 296 and the coupling members 296 are movable between an uncoupled position, in which feet of the coupling members 296 are spaced-apart and disengaged with the exterior of the pipe P, and a coupled position, in which the feet of the coupling members 296 engage the exterior of the pipe P to secure the pipe machining apparatus 28 to the pipe P. In FIG. 11, the coupling members 296 are maintained in the uncoupled position.

Figure 12:
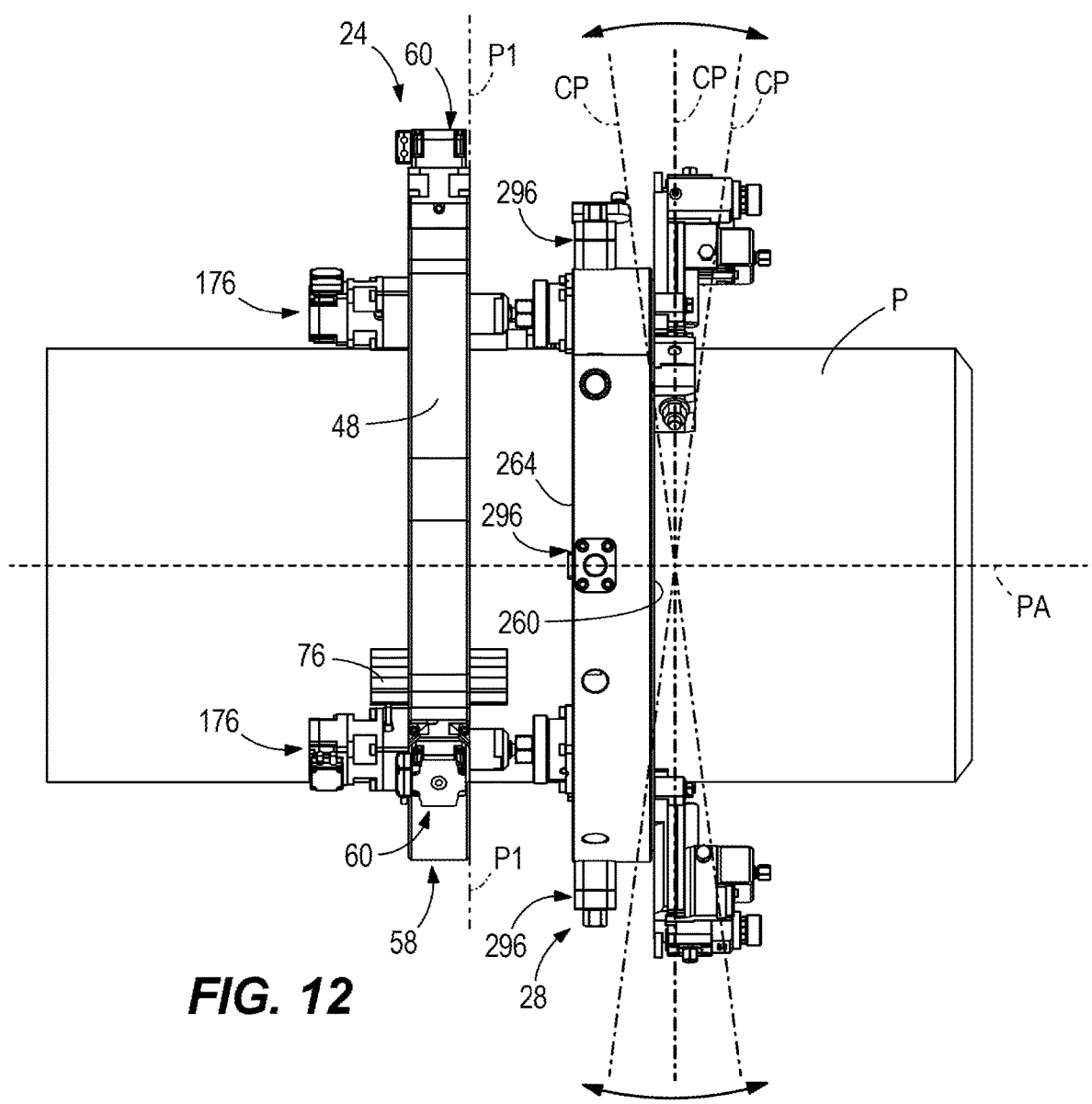
FIG. 12 is a right side elevation view of the pipe machining apparatus positionable in a variety of positions by the positioning apparatus to provide a variety of cutting planes.
Figure 13:
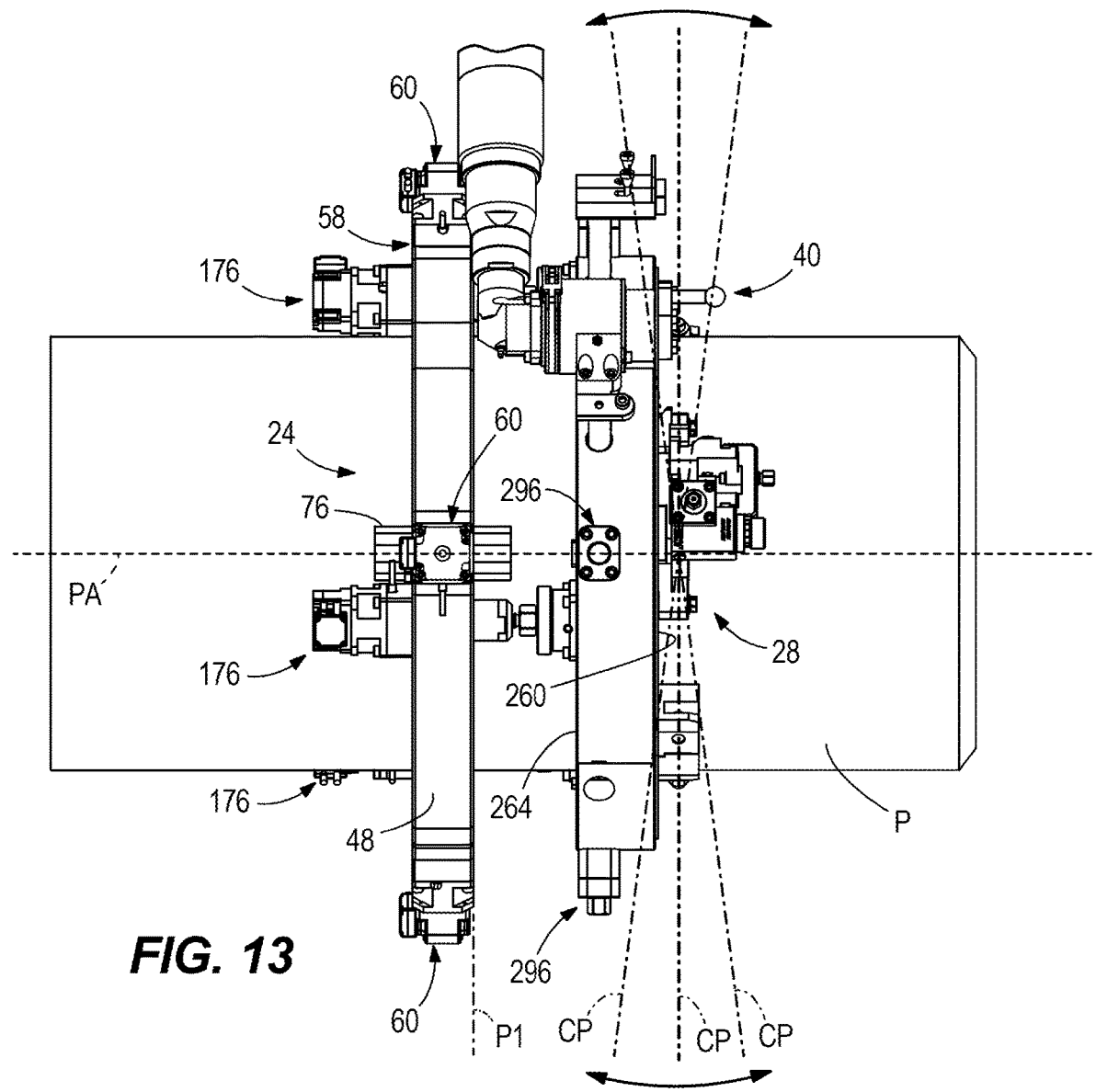
FIG. 13 is a top view of the pipe machining apparatus positionable in a variety of positions by the positioning apparatus to provide a variety of cutting planes, wherein FIGS. 12 and 13 establish three-dimensional movement capabilities of the positioning apparatus to move the pipe machining apparatus to liberally position the cutting plane within a three-dimensional coordinate system.

Referring now to FIGS. 12 and 13, the controller 268 is in electrical communication with the positioning apparatus 24, which is coupled to the pipe machining apparatus 28 to move the pipe machining apparatus 28 into a desired position. As indicated above, the controller 268 may independently actuate one or more of the coupling members 60 and the adjustment members 176 to move the pipe machining apparatus 28 as desired. FIGS. 12 and 13 illustrate exemplary planes CP (cutting planes in the illustrated example) representing various planes CP in which the pipe machining apparatus 28 may be positioned within a three-dimensional coordinate system.

Figure 14:
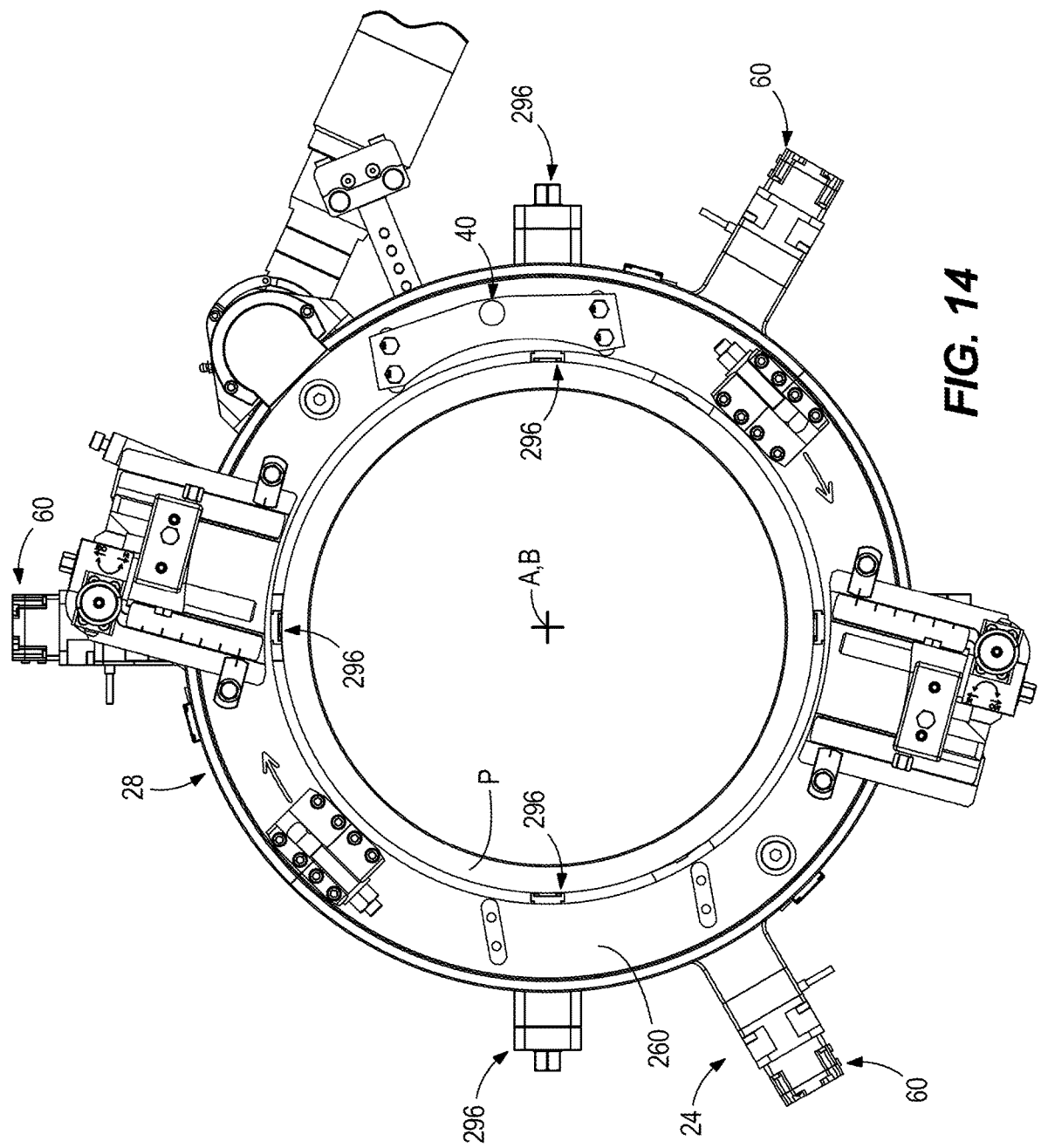
FIG. 14 is a front elevation view of the positioning apparatus and the pipe machining apparatus in a desired location wherein the pipe positioning apparatus is coupled to the pipe with clamping mechanisms engaging the pipe.

With reference to FIG. 14, once the pipe machining apparatus 28 and/or the cutting plane CP is desirably positioned, the coupling members 296 of the pipe machining apparatus 28 are actuated to move the coupling members 296 to their coupled position to secure the pipe machining apparatus 28 to the pipe P. The pipe machining apparatus 28 may be operated to cut the pipe P once it is secured to the pipe P. In an embodiment, the coupling members 296 of the pipe machining apparatus 28 are identically formed to those of the coupling members 60 of the positioning apparatus 24 and the specifics are not repeated herein; the coupling members 296 are affixed to the frame 46. Similarly to the adjustment members 176 and the coupling members 60 of the positioning apparatus 24, the coupling members 296 of the pipe machining apparatus 28 may be either manually actuated or automatically/power actuated by drive members. In the illustrated example, the coupling members 296 of the pipe machining apparatus 28 are manually manipulated with a tool. In examples where the coupling members 296 are automatically actuated, the coupling members 296 may include drive members and load cells similar to the coupling members of the positioning apparatus 24. In such an example, the controller 268 similarly communicates with the drive members and the load cells to adequately activate the coupling members 296 to ensure desired coupling of the pipe machining apparatus 28 to the pipe P.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the pipe machining system 20 may be utilized in any orientation and use of such terms is intended to correspond to the exemplary orientation of the pipe machining system 20 illustrated in the drawings. The use of these terms in association with the pipe machining system 20 is not intended to limit the pipe machining system 20 to a single orientation or to limit the pipe machining system 20 in any manner.

It should also be understood that use of numerical terms such as, for example, "first", "second", "third", etc., should not be interpreted to imply an order or sequence of components or functions. Moreover, use of these numerical terms is not intended to pertain to only the component and/or function with which they are utilized. Rather, the use of these numerical terms is merely used to assist the reader with understanding the subject matter of the present disclosure. For example, one of the components in the specification may be referenced as a "first component", but the same component may be referenced differently in the claims (e.g., second or third component).

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A method of cutting a pipe comprising:
   positioning a positioning apparatus on the pipe;
   moving the positioning apparatus relative to the pipe to center the positioning apparatus on the pipe;
   attaching a pipe machining apparatus to the positioning apparatus; and
   moving the pipe machining apparatus relative to the positioning apparatus and relative to the pipe, wherein a cutting plane of the pipe machining apparatus is moved to a position which is non-parallel to a plane which is parallel to front and rear surfaces of the positioning apparatus.

2. The method of claim 1,
   wherein the positioning apparatus includes adjustment members, and
   the pipe machining apparatus is moved relative to the positioning apparatus and relative to the pipe by activating one or more of the adjustment members.

3. The method of claim 2, further comprising tracking positions of the pipe machining apparatus.

4. The method of claim 2, wherein the positioning apparatus includes coupling members which are activated to position the positioning apparatus on the pipe.

5. The method of claim 4, wherein the coupling members are manually actuated.

6. The method of claim 4, wherein the coupling members are powered actuated.

7. The method of claim 4, further comprising cutting the pipe with the pipe machining apparatus.

8. The method of claim 2, wherein at least one of the adjustment members is manually actuated.

9. The method of claim 2, wherein at least one of the adjustment members is powered actuated.

10. The method of claim 2, further comprising cutting the pipe with the pipe machining apparatus.

11. The method of claim 1, further comprising cutting the pipe with the pipe machining apparatus.

12. The method of claim 1, further comprising tracking positions of the pipe machining apparatus.

13. The method of claim 1, wherein the positioning apparatus includes coupling members which are activated to position the positioning apparatus on the pipe, and wherein the positioning apparatus is moved relative to the pipe by activating at least one coupling member.

14. The method of claim 13, further comprising cutting the pipe with the pipe machining apparatus.

15. A method of cutting a pipe having a longitudinal axis, the method comprising:
   positioning a positioning apparatus on the pipe;
   actuating coupling members on the positioning apparatus to move the positioning apparatus relative to the pipe to center the positioning apparatus on the pipe;
   attaching a pipe machining apparatus to the positioning apparatus after the positioning apparatus is centered on the pipe;
   actuating one or more adjustment members on the positioning apparatus to move a cutting plane of the pipe machining apparatus to a position which is non-parallel to a plane which is parallel to front and rear surfaces of the positioning apparatus; and
   cutting the pipe with the pipe machining apparatus.

16. The method of claim 15, further comprising tracking positions of the pipe machining apparatus.

17. The method of claim 15, wherein at least one of the coupling members and the adjustment members are manually actuated.

18. The method of claim 15, wherein at least one of the coupling members and the adjustment members are powered actuated.

* * * * *